United States Patent
Gupta et al.

(10) Patent No.: US 10,804,988 B2
(45) Date of Patent: Oct. 13, 2020

(54) SPATIAL INTERFERENCE CANCELLATION FOR SIMULTANEOUS WIRELESS AND INFORMATION POWER TRANSFER

(71) Applicants: Washington State University, Pullman, WA (US); The University of British Columbia, Vancouver, B.C. (CA)

(72) Inventors: Subhanshu Gupta, Pullman, WA (US); Erfan Ghaderi, Pullman, WA (US); Sudip Shekhar, Vancouver (CA); Shyam Venkatasubramanian, Pullman, WA (US); Ajith Sivadhasan Ramani, Burlington (CA)

(73) Assignees: Washington State University, Pullman, WA (US); The University of British Columbia, Vancouver, B.C. (CA)

( * ) Notice: Subject to any disclaimer, the term of this patent is extended or adjusted under 35 U.S.C. 154(b) by 0 days.

(21) Appl. No.: 16/564,853

(22) Filed: Sep. 9, 2019

(65) Prior Publication Data
US 2020/0083936 A1    Mar. 12, 2020

Related U.S. Application Data

(60) Provisional application No. 62/728,691, filed on Sep. 7, 2018, provisional application No. 62/860,995, filed on Jun. 13, 2019.

(51) Int. Cl.
| | | |
|---|---|---|
| *H03K 5/159* | (2006.01) | |
| *H04B 7/0456* | (2017.01) | |
| *H04L 27/00* | (2006.01) | |
| *H04B 7/08* | (2006.01) | |
| *H04B 7/005* | (2006.01) | |
| *H04B 1/10* | (2006.01) | |

(52) U.S. Cl.
CPC ......... *H04B 7/0473* (2013.01); *H04B 1/1081* (2013.01); *H04B 7/005* (2013.01); *H04B 7/0828* (2013.01); *H04L 27/0014* (2013.01)

(58) Field of Classification Search
CPC ...... H04L 25/03057; H04L 2015/0349; H01Q 3/36; H01Q 21/0006; H01Q 3/34; H04B 1/0475
USPC ........................................................ 375/232
See application file for complete search history.

(56) References Cited

U.S. PATENT DOCUMENTS

| | | | | |
|---|---|---|---|---|
| 6,327,298 B1* | 12/2001 | Grobert | ................... | G01S 19/21 342/357.59 |
| 2013/0083676 A1* | 4/2013 | Stager | ................. | H04L 27/0006 370/252 |
| 2014/0242935 A1* | 8/2014 | Cox | ........................ | H04B 1/525 455/302 |
| 2015/0256286 A1* | 9/2015 | Johnson | ................. | H04K 3/228 455/1 |

\* cited by examiner

*Primary Examiner* — Khai Tran
(74) *Attorney, Agent, or Firm* — W&C IP

(57) ABSTRACT

A discrete-time delay (TD) technique in a baseband receiver array is disclosed for canceling wide modulated bandwidth spatial interference and reducing the Analog-to-Digital Conversion (ADC) dynamic range requirements. In particular, the discrete-time delay (TD) technique first aligns the interference using non-uniform sampled phases followed by uniform cancellation using a cancellation matrix, such as, for example, a Truncated Hadamard Transform implemented with antipodal binary coefficients.

22 Claims, 22 Drawing Sheets

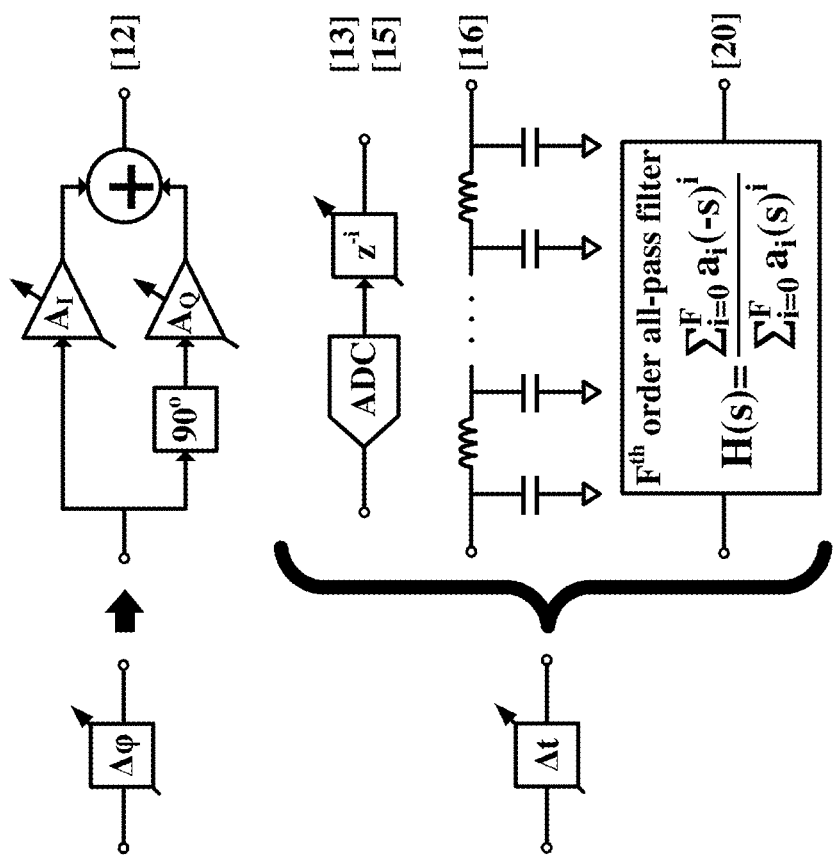
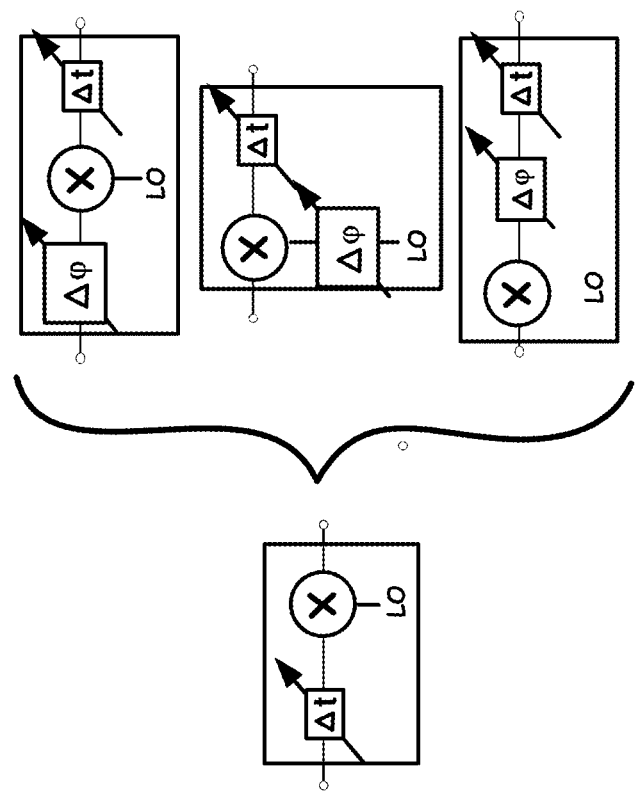
FIG. 5B
FIG. 5A

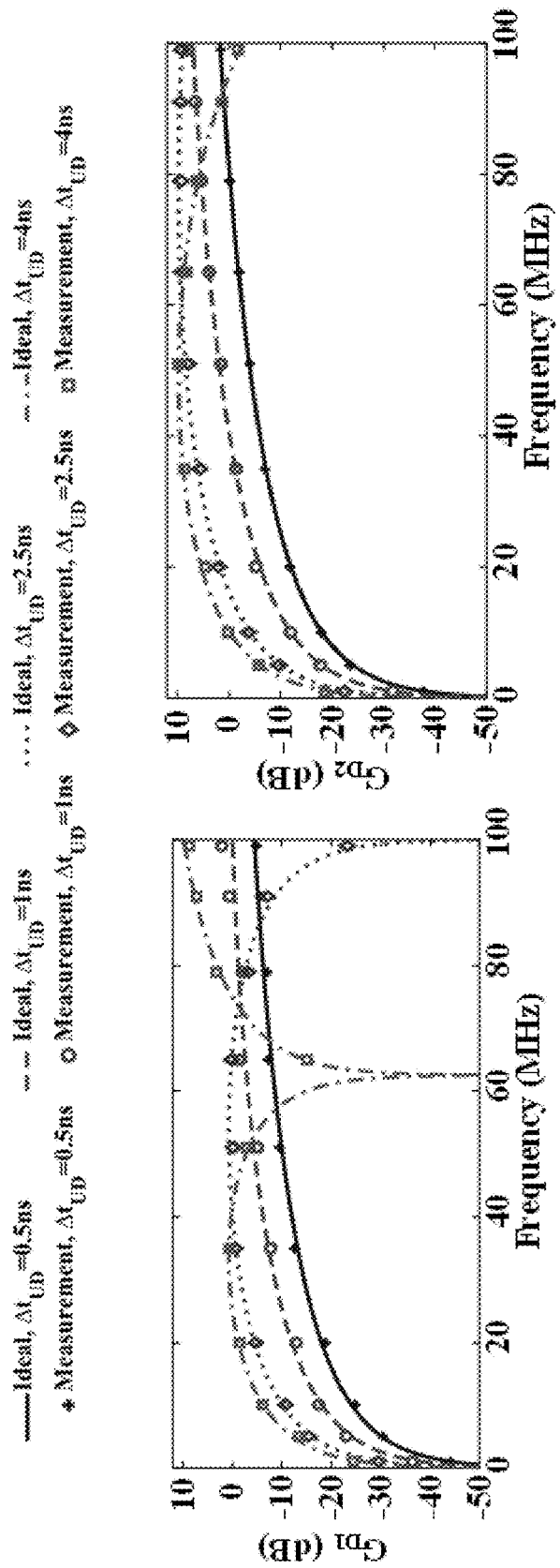
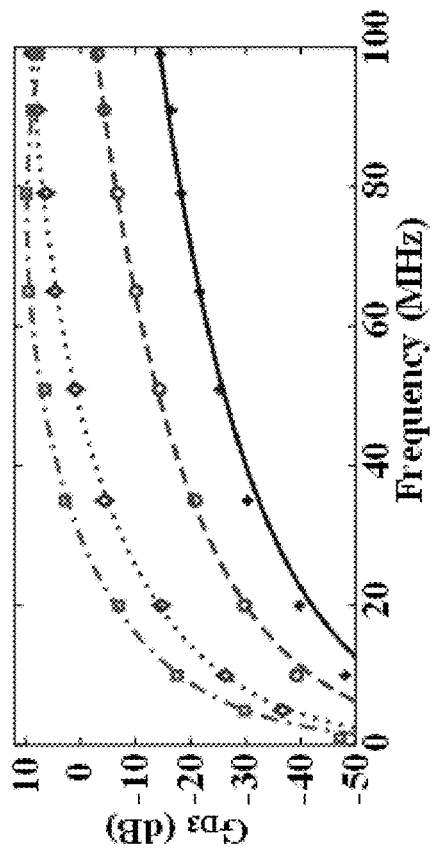
FIG. 26A
FIG. 26B
FIG. 26C

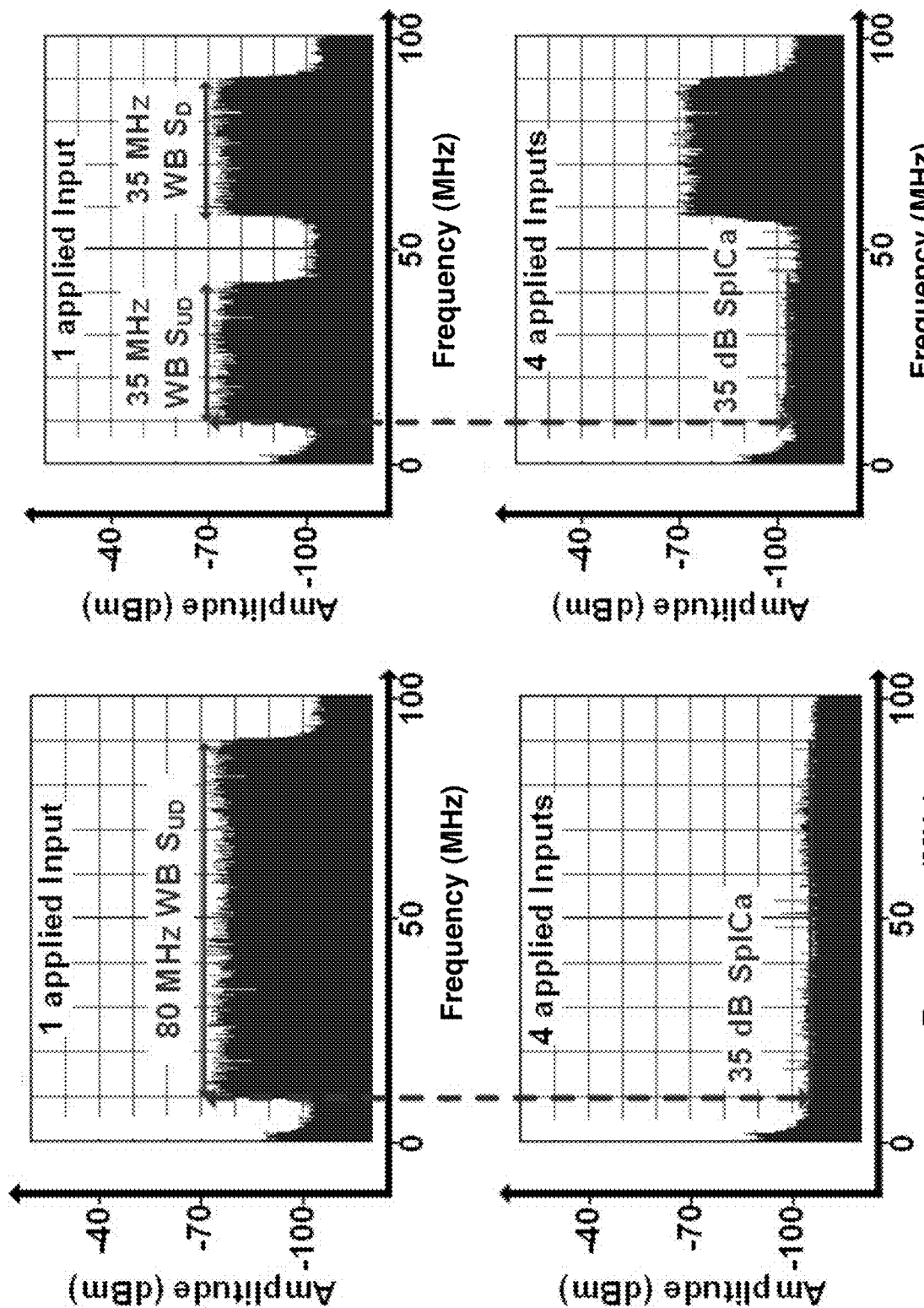

SPATIAL INTERFERENCE CANCELLATION FOR SIMULTANEOUS WIRELESS AND INFORMATION POWER TRANSFER

CROSS-REFERENCE TO RELATED APPLICATION(S)

The present application claims under 35 U.S.C. § 119, the priority benefit of U.S. Provisional Application No. 62/728,691, filed Sep. 7, 2018, entitled "Spatial Interference Cancellation for Simultaneous Wireless and Information Power Transfer," and U.S. Provisional Application No. 62/860,995, filed Jun. 13, 2019, entitled "Spatial Interference Cancellation for Simultaneous Wireless and Information Power Transfer," both of which are incorporated herein by reference in its entirety.

GOVERNMENT INTERESTS

This invention was made with government support under grant no. 1705026 awarded by National Science Foundation. The government has certain rights in the invention.

FIELD OF THE INVENTION

The present embodiments herein relate to wideband modulated spatial interference cancellation. In particular, the present system and method embodiments disclosed herein enable a true time-delay technique that enables cancelling wideband modulated spatial interreference and reduces the ADC dynamic range requirements in a baseband receiver array.

BACKGROUND OF THE INVENTION

Discussion of the Related Art

The exponential growth in wireless communication is spurring development of Multiple-Input and Multiple-Output (MIMO) transceivers for higher spectral efficiencies, wide modulation bandwidths (BWs), and spatial multiplexing gains. However, as the next-generation sub-6 GHz and millimeter-wave networks progress towards ultra-dense small cells, the dramatic shortening of inter-cell distances will result in both line-of-sight and non-line-of-sight interference channels. This problem is severe for multi-user communications networks operating in crowded electromagnetic environments and can significantly degrade the performance of radios.

While interference mitigation using electronic phased-arrays has been an active research area, the dense small-cell mobile networks with wide modulated BWs and higher data rates for next-generation systems impose unique challenges to the front-end hardware that has not to this date been effectively addressed. A particular employed method of cancelling interference in such systems is the incorporation of a phase-shift (PS), wherein the method approximates a time-delay (TD) so as to cancel interference at a single frequency, i.e., so as to generate a single null.

However, for next-generation systems with wide modulated BWs, the phase-shift (PS) method results in interference leakage and cancellation starts to become imperfect even in narrow BWs. Such a method also requires significantly higher dynamic range for the baseband (BB) and in the step of Analog-to-Digital Conversion (ADC). Moreover, the PS method is carried out in RF wherein higher area and power is required for implementation and passive device mismatches occur.

Background information on a wide-modulated bandwidth interference cancellation for MIMO, is described and claimed in U.S. Pat. No. 8,488,724 B2 entitled "Wideband interference mitigation for devices with multiple receivers," filed May 14, 2010, to Daneshrad et al, including the following, " . . . a method of suppressing interference can include receiving one or more first signals including components from a plurality of sub-channels. Each of the first signals can be converted into a respective plurality of first sub-band frequency components. A respective spatial filter can be determined for each frequency sub-band using one or more corresponding first sub-band components for each respective spatial filter. One or more second signals including components from the plurality of sub-channels can be received. Each of the second signals can be converted into a respective plurality of second sub-band frequency components. A corresponding plurality of filtered sub-band components can be generated by applying the respective spatial filters to the corresponding second sub-band components for each of the second signals."

Background information on using a phase-shift (PS) method for interference cancellation, is described in IEEE publication entitled "A 4-Element Phased-Array System With Simultaneous Spatial- and Frequency-Domain Filtering at the Antenna Inputs," published in IEEE Journal of Solid-State Circuits (Volume: 49, Issue: 6, June 2014) including the following, "[t]o reject strong interference in excess of 0 dBm, a 4-element LO-phase shifting phased-array receiver with 8-phase passive mixers terminated by baseband capacitors is presented. The passive mixers upconvert both the spatial and frequency domain filtering from baseband to RF, hence realizing blocker suppression directly at the antenna inputs. A comprehensive mathematical model provides a set of closed-form equations describing the spatial and frequency domain filtering including imperfections . . . ."

Accordingly, a need exists for a MIMO receiver with wideband cancellation technique for spatially separated wideband modulated signals that coexist in the same frequency channel. In addition, the system and method embodiments herein exploit the benefits of using a true time-delay technique for wideband Spatial Interference Cancellation (SpICa) in MIMO receivers. Unlike existing receivers, it requires far less power, occupies less area, and is BW-, process-, and supply-scalable. The embodiments herein are directed to such a need.

BRIEF SUMMARY OF THE DISCLOSURE

In a first aspect, a multi-input multi-output (MIMO) spatial interference cancellation receiver is disclosed, including: a phase-shifter configured to time-align at least one or more wideband spatial desired signals and one or more wideband spatial undesired noise signals so as to remove a portion of the one or more undesired signals; a discrete time-delay array configured to time-align a residual one or more residual wideband spatially interfering undesired noise signals; and a cancellation matrix component configured to cancel out the residual one or more wideband spatially interfering undesired noise signals, wherein the wideband one or more desired signals are noise-free.

In a second aspect, a method of spatial interference cancellation is disclosed, including: time-aligning at least one or more wideband spatial desired signals and one or more wideband spatially interfering undesired noise signals so as to remove a portion of the one or more undesired signals; discrete time-delaying a residual one or more residual wideband spatially interfering undesired noise signals; and matrix cancelling out the residual one or more wideband spatially interfering undesired noise signals so as to result in one or more noise-free wideband spatial desired signals.

Accordingly, a BB delay implementation, as disclosed herein, is utilized to remove the frequency-dependent residue phase that exists in a conventional PS-based SpICa scheme. After time-aligning the undesired signals at the BB, SpICa can thus be performed through a differential orthogonal matrix, which subtracts half of the signals from the other half uniquely. In particular, the system(s) and method embodiments herein utilize a true time-delay technique for wideband spatial interference cancellation in MIMO receivers that beneficially uses less power and occupies less area and is BW-, process-, and supply-scalable.

BRIEF DESCRIPTION OF THE DRAWINGS

FIG. 5A TTD-based beamforming realized through delay-compensation in RF or BB as shown.

FIG. 5B shows various implementations for required TTD and phase shift.

FIG. 26A shows a plot of measurement results of the single-tone undesired signal SpICa performance vs. frequency for Measurement and simulation results of the single-tone desired signal conversion gain vs. frequency for $\Delta t_D=0$ and four cases of $\Delta t_{UD}$.

FIG. 26B shows a second plot of measurement results of the single-tone undesired signal SpICa performance vs. frequency for Measurement and simulation results of the single-tone desired signal conversion gain vs. frequency for $\Delta t_D=0$ and four cases of $\Delta t_{UD}$.

FIG. 26C shows a third plot of measurement results of the single-tone undesired signal SpICa performance vs. frequency for Measurement and simulation results of the single-tone desired signal conversion gain vs. frequency for $\Delta t_D=0$ and four cases of $\Delta t_{UD}$.

FIG. 27A shows the SpICa measurement for a wide modulated BW undesired signal vs. frequency without any desired signal.

FIG. 27B shows the SpICa measurement for a wide modulated BW undesired signal vs. frequency with a wide modulated BW desired signal.

DETAILED DESCRIPTION OF THE DISCLOSURE

Figure 1:
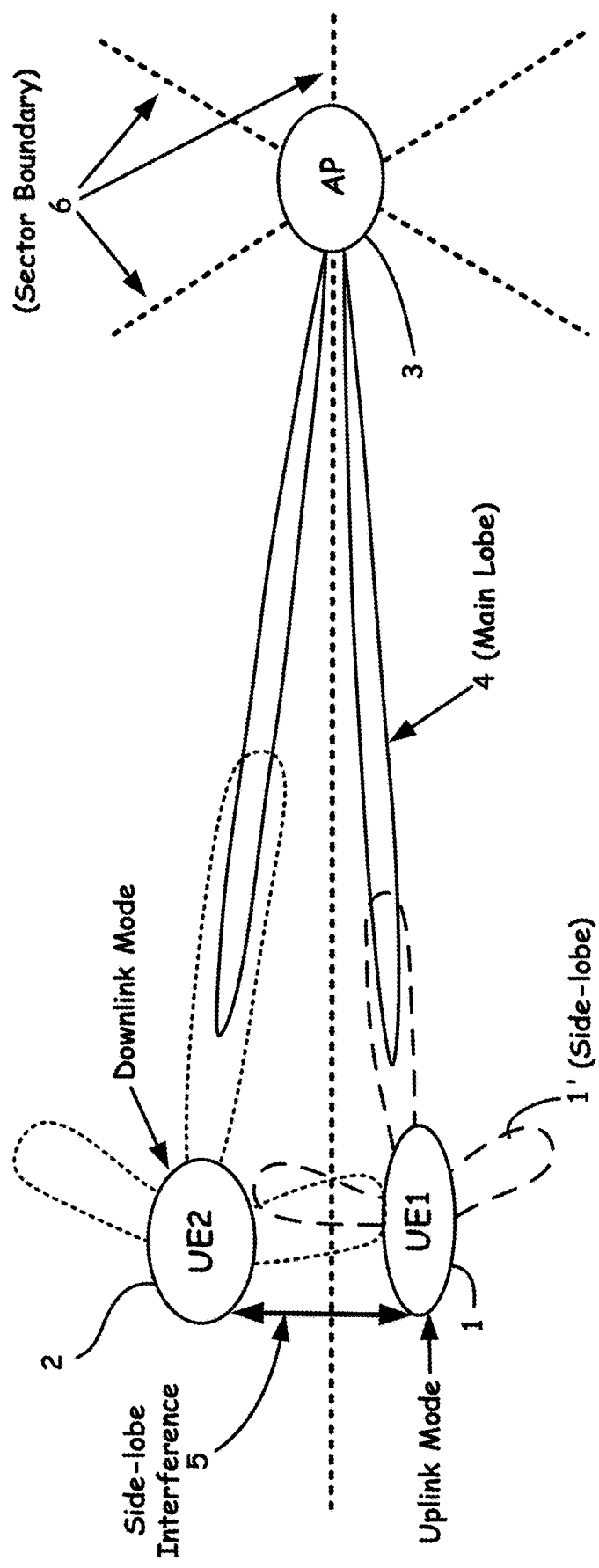
FIG. 1 illustrates a problematic scenario of interference in dense small cells with aggressive (MIMO) frequency use.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

FIG. 1 is shown as an example problematic scenario of a multi-user communication network to aid the reader in appreciating the novelty of the embodiments, as disclosed herein. In particular, FIG. 1 illustrates such a scenario wherein two user elements (UEs), e.g., (UE1) 1 and (UE2) 2, located in adjacent cell-sectors and the same frequency channel across sector boundaries (see reference character 6), are communicating with an access point (AP) 3, configured in uplink (going from ground to a satellite) and downlink (the communication going from a satellite to ground) modes respectively. User elements UE1 and UE2 use the same frequency channel across the sector boundaries.

Even though the strength of a side-lobe (e.g., see reference character 1') can often be 10-15 dB lower than a main-lobe 4, the in-band (same frequency channel) side-lobe interference 5 can desensitize the receiver (RX) 3 or degrade the in-band SNR if not addressed. Such an interference problem worsens near a sector boundary 6 creating poor connection zones, especially if a small cell is operating near maximum capacity. Accordingly, multiple system parameters impact the onset of an interference-limited network behavior over noise-limited behavior. These parameters can include the number of UEs and APs, antenna gains, operational bandwidth (BW), blockage characteristics, and the choice of MIMO architecture. Thus, the embodiments herein recognize and address such multiple system parameters by frequency planning and via the utilization of component configurations that integrate novel spatial cancellation techniques, as disclosed herein.

Figure 2:
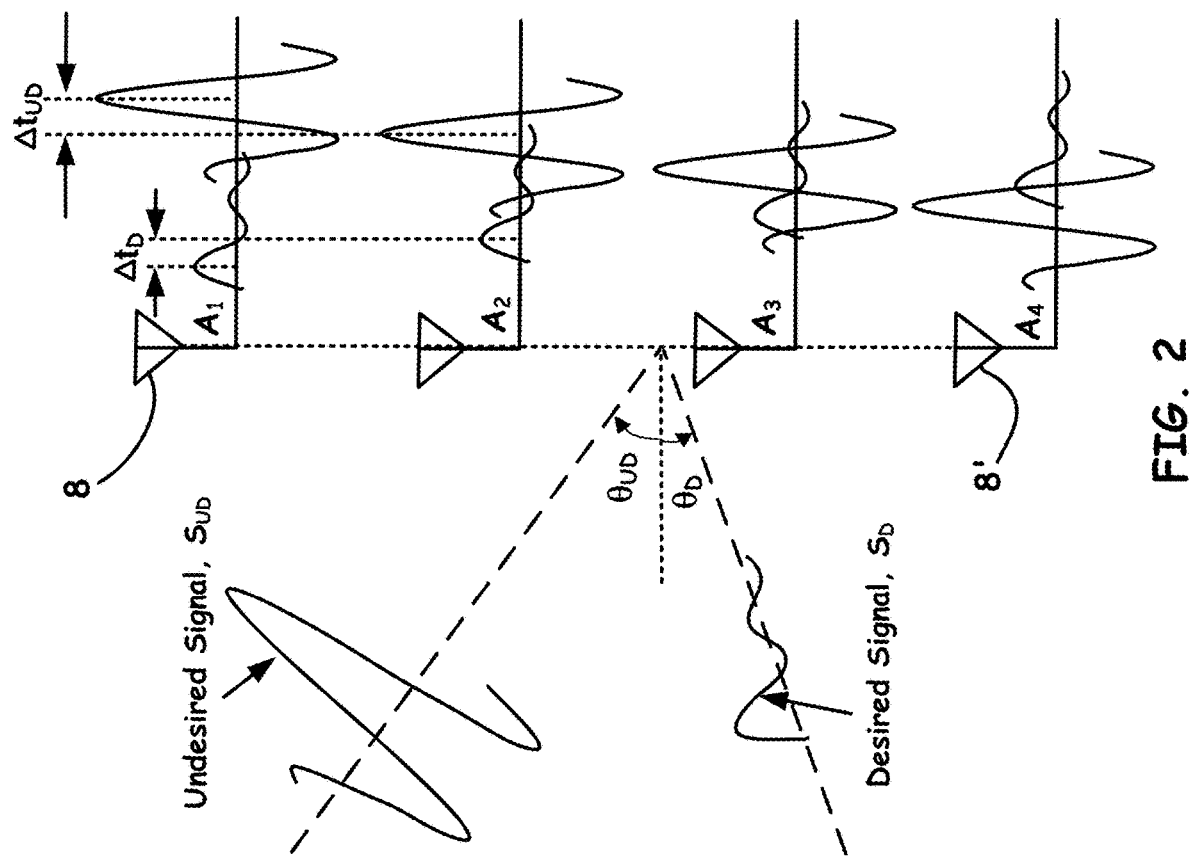
FIG. 2 shows a time-domain representation of a source and angularly received desired ($S_D$) and undesired ($S_{UD}$) signals for an example four-element linear antenna array.

FIG. 2 illustrates a time-domain representation of a source that provides received desired and undesired signals at respective angular orientations ($S_D$ and $S_{UD}$) to a four-element linear antenna array (denoted as $A_1$ (also denoted as reference character 8), $A_2$, $A_3$, and $A_4$ (also denoted as reference character 8') to aid the reader in appreciating the invention herein. Accordingly, an incident input signal (i.e., a desired ($S_D$) and an undesired signal ($S_{UD}$), as shown in FIG. 2, can be written in the time-domain as:

$$y_i(t)=S_D[t-(i-1)\Delta t_{UD}]+S_{UD}[t-(i-1)\Delta t_{UD}], i=1\ldots 4 \quad (1)$$

where i is the element number. The same equation can be described in the frequency domain as:

$$y_i(j2\pi f)=S_D(j2\pi f)\cdot e^{-j(i-1)2\pi f\Delta t_D}+S_{UD}(j2\pi f)\cdot e^{-j(i-1)2\pi f\Delta t_{UD}} \quad (2)$$

where $\Delta t_D$ and $\Delta t_{UD}$ are the delays for the desired and undesired signal, respectively, and defined as:

$$\Delta t_D = \frac{d}{\lambda_c} \cdot \frac{\sin\theta_D}{f_c} \quad (3)$$

$$\Delta t_{UD} = \frac{d}{\lambda_c} \cdot \frac{\sin\theta_{UD}}{f_c} \quad (4)$$

Here, d, $\lambda_c$ and $f_c$ are the element spacing, carrier wavelength, and frequency respectively.

In a PS-based MIMO RX, the input signal BW is assumed to be small and can be written as:

$$y_i(j2\pi f)=S_D(j2\pi f)\cdot e^{-j(i-1)\Delta\varphi_D}+S_{UD}(j2\pi f)\cdot e^{-j(i-1)\Delta\varphi_{UD}} \quad (5)$$

where the PS elements $\Delta\varphi_D$ and $\Delta\varphi_{UD}$ are calculated as follows:

$$\Delta\varphi_D = 2\pi f_c \cdot \Delta t_D = \frac{d}{\lambda_c/2}\pi \cdot \sin\theta_D \quad (6)$$

$$\Delta\varphi_{UD} = 2\pi f_c \cdot \Delta t_{UD} = \frac{d}{\lambda_c/2}\pi \cdot \sin\theta_{UD} \quad (7)$$

Mathematically, each $y_i(j2\pi f)$ is multiplied by $e^{j(i-1)\Delta\varphi_{UD}}$, resulting in the overall phase for the undesired signal as $\Delta\varphi_{UD}-2\pi f\Delta t_{UD}$. This term is frequency-dependent and zeroes at a single frequency only (removes a portion of the undesired signals), leaving a residue for other frequencies offset from carrier frequency, $f_c$. The approximation described in the equations above is thus valid as long as the received signal is a single-tone or narrowband (NB) signal.

The residue leads to interference leakage leading to increased dynamic range for the BB and ADC after down-conversion.

Figure 3:
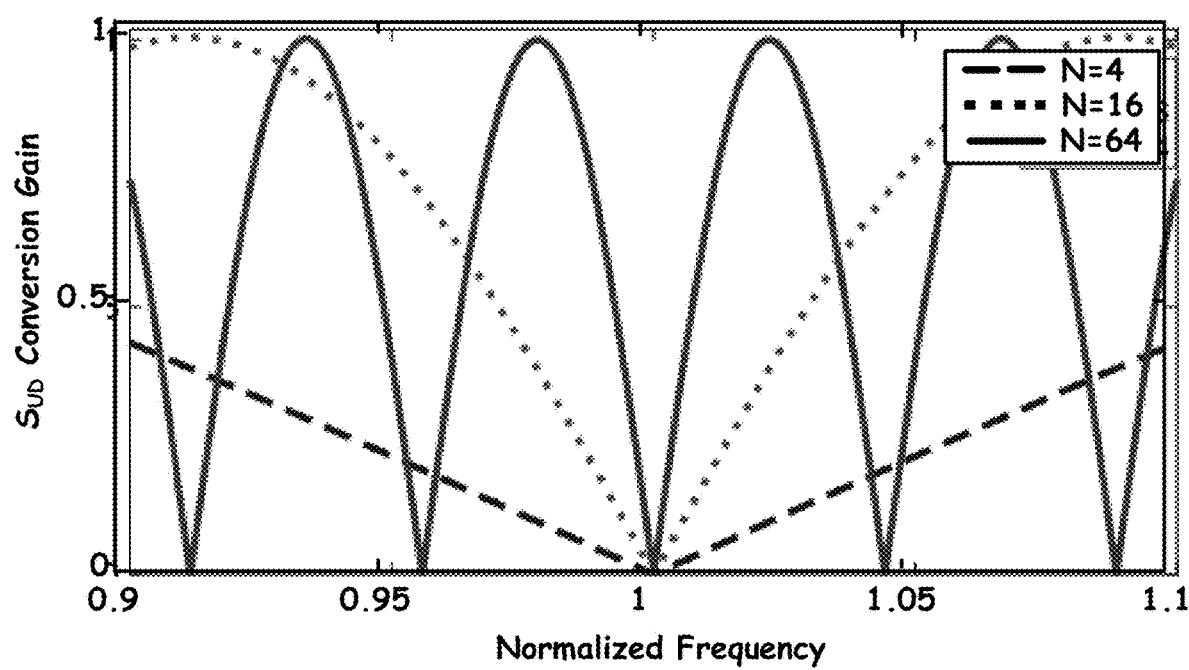
FIG. 3 shows a Spatial Interference Cancellation (SpICa) simulation in a PS-based scheme vs. normalized frequency over 20% fractional bandwidth with differing number of antennas.

FIG. 3 shows the rejection performance of the undesired signal across the normalized frequency with an example angle of arrival (AoA)=45°, in particular, FIG. 3 shows interference leakage in a PS-based SpICa with example 4, 16, and 64 elements, as denoted. In such cases, the even elements of $y_i(t)$ are assumed to be subtracted from its odd elements. As illustrated, for a higher number of antennas, the undesired signal leakage is larger (higher conversion gain for $S_{UD}$) and cancellation starts to become imperfect even in narrower BWs as the number of antennas are progressively increased. This simulation shows the need to compensate the delay between the received signals before performing SpICa, ideally independent of the input signal BW.

Accordingly, a BB delay implementation, as disclosed herein, is utilized to remove the frequency-dependent residue (residual) phase ($\Delta\varphi UD - 2\pi f\Delta tUD$) that exists in a conventional PS-based SpICa scheme. After time-aligning the undesired signals at the BB, SpICa can thus be performed through a differential orthogonal matrix, which subtracts half of the signals from the other half uniquely. At the output of the matrix, the undesired signal component is uniformly rejected across BW without any residue compared to the PS-based SpICa, i.e. the proposed intervention is angle- and frequency-independent.

Specific Description

Figure 4:
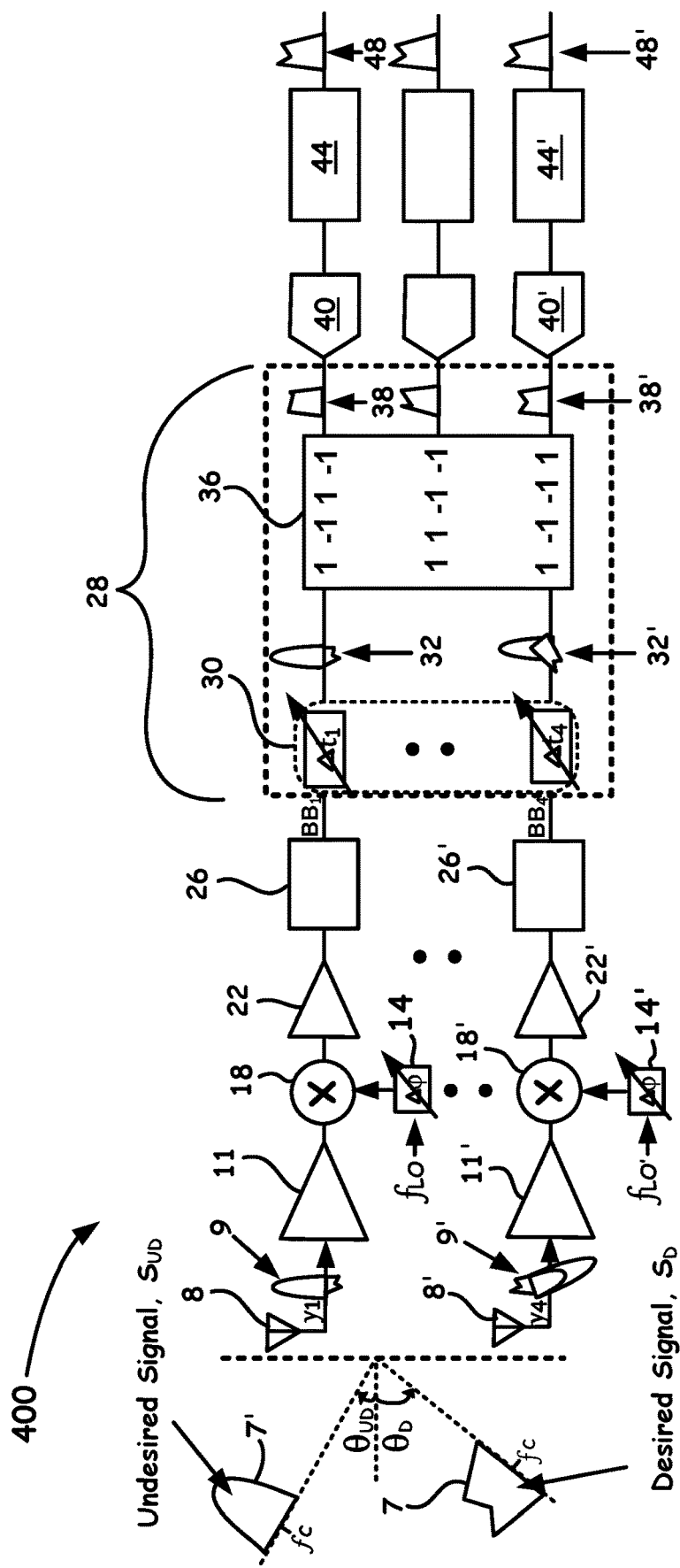
FIG. 4 illustrates an example embodiment of a discrete time-delay Spatial Interference Cancellation (SpICa) receiver/methodology, as disclosed herein.

Turning specifically to example beneficial embodiments, FIG. 4 shows a configuration of a four-element (4-antenna array with two antennas particularly shown) Spatial Interference Cancellation (SpICa) receiver (RX) 400. It is to be noted, however, that while FIG. 4 shows a 4-element receiver (i.e., 4-antenna array), receiver 400 illustrated in FIG. 4, is equally capable of being configured with up to 8, often up to 16, more often up to 64 antennas, even more often up to 1500 antennas while addressing spatially separated wide modulated bandwidth (BW) signals that coexist in the same frequency channel.

However, for illustrative nonlimiting purposes to aid in understanding the beneficial aspects of the embodiments herein so as to comport with FIG. 2 above, FIG. 4 shows such a non-limiting reduced to practice four-element (4-antenna array with two antennas particularly shown) Spatial Interference Cancellation (SpICa) receiver (RX). It is to be appreciated that the receiver 400, as shown in FIG. 4 includes an important True time-delay (TTD) block 28 (also shown enclosed by the dashed box for clarity) that incorporates a delay compensating array 30 and a cancellation matrix component 36, as discussed in detail below. It is also to be appreciated that while system 400 is utilized for illustrative purposes of the example novel embodiments of the present invention, it is to be understood that other alternative commercial and custom configurations, as briefly stated above, having various other components can also be incorporated when using the techniques of the present application is capable of being operated within the design parameters of the invention.

In a method of operation, a desired signal 7 (also denoted as $S_D$) and an undesired signal 7' (also denoted as Sup) are received in combination (see 9 and 9') at respective angular orientations ($q_D$ and $q_{UD}$) at each given antenna 8 and 8' element (also denoted as $y_1$ and $y_4$ respectively). Before being passed on to the True time-delay (TTD) block 28 as BB to perform SpICa through TTD, the receiver 400, utilizes pre-processing components/steps to include, but not strictly limited to, an amplifier (11, 11'), a Local Oscillator (denoted as $f_{LO}$, $f_{LO}'$), a phase shifter (14, 14'), a mixer (18, 18'), an additional amplifier (22, 22'), and a filter (26, 26') all of which is described in detail below as an illustrative preprocessing feature of the embodiments herein. It is to be appreciated that because the SpICa is being done at BB, the RF frontend (RF-FE) is configured with substantial linearity to down-convert the strong undesired signal ($S_{UD}$) without distorting the desired signal ($S_D$).

In particular, after the desired 7 (hereinafter referred to as $S_D$) and undesired signals 7' (hereinafter referred to as $S_{UD}$) are received at a given antenna element 8 and 8', such signals are amplified using, for example, a low noise amplifier (LNA) 11, 11' while maintaining the signal-to-noise ratio (SNR) of the received signals ($S_D$, $S_{UD}$). A local oscillator (LO) $f_{LO}$, $f_{LO}'$ is used to generate a frequency with a value of often, but not necessarily, the carrier frequency of the desired signal and such a generated frequency is directed into a phase shifter component 14, 14' operating as a pseudo-time delay element configured so as to in this arrangement, provide a phase shift of the generated frequency. In particular, it is to be appreciated that the pseudo-time delay (TD) element (i.e., phase shifter components 14, 14') in LO ($f_{LO}$, $f_{LO}'$), operating at a single frequency is simply analogous to a phase shift.

Thereafter, the mixer 18, 18', as known to those skilled in the art, combines the amplified signal (current) resulting from amplifier 11, 11' with the phase-shifted frequency generated by the local oscillator $f_{LO}$, $f_{LO}'$ to enable converting the signal from RF to BB. The down-converted and phase-shifted signal at the output of the mixer 18, 18' is thereafter directed to the amplifier 22, 22', often a transimpedance amplifier (TIA) to in this illustrative embodiment, convert the current signal to a voltage signal for further processing. The filters 26, 26', often configured anti-aliasing filters (AAF), operate in this illustration as low pass filters before sampling the resultant signals to restrict the bandwidth of the signal to substantially satisfy the Nyquist-Shannon sampling theorem over the modulated BW. It is to be noted that while anti-aliasing filters (AAF) are beneficial in the embodiment shown in FIG. 4, other capable filters such, as but not limited to, a continuous-time filter, a discrete-time filter or a switched-capacitor operating as a filter can also be utilized without departing from the scope and spirit of the invention.

After being passed through the filters 26, 26', the resultant BB signals are received by the true time-delay (TTD) block 28 having the delay compensating array 30 (i.e., for True-time delay (TTD) implementation as detailed below) and the cancellation matrix component 36, also discussed in detail below. In general, however, the delay compensation array 30 implemented through a non-uniform discrete TD technique in the non-limiting embodiment shown in FIG. 4 is designed to provide a delay compensation range between the first and last antenna and with a desired delay compensation resolution depending on system configurations. The result is time alignment of the undesired signals as generally illustrated by noted reference characters 32, 32'.

For example, a beneficial example delay-compensation range for the embodiments herein include a range from at least 5 picoseconds (ps) up to 5 nanoseconds (ns) between the first and last antenna but it is to be noted that the delay-compensation range often scales as (n*5 ns) and with a resolution of at least 5 picoseconds, often with a resolution of the scales as ((n−1)*5 ps). For the 4-antenna array 400 shown in FIG. 4, a BB discrete TD-based SpICa over 100

MHz modulated BW in BB resulted, wherein a delay compensation range of 15 ns (between the first and last antenna) and a delay compensation resolution of 5 ps was chosen to illustrate the invention disclosed herein in a non-limiting manner. To reiterate as stated above, the design embodiments herein are scalable in terms of array size, SpICa performance, and BW.

To illustrate for an 8-antenna array, as detailed below herein, the delay-compensation range was designed for up to 35 ns. Accordingly, for a 1050 antenna array, the delay-compensation range can extend up to 5,250 ns. Thereafter, the cancellation matrix component 36 receives the desired and undesired signals from the delay compensating array 30. The cancellation matrix component 36 discussed below often includes a Truncated Hadamard Matrix (THM). However, while a Truncated Hadamard Matrix (THM) is beneficial, other matrix components/methodologies can also be utilized, such as, but not limited to a Fourier transform matrix, a hamming code matrix, and a non-modified Hadamard matrix.

Post-processing steps/components (e.g., digital techniques in RF-FE), which are not necessarily required in some instances for the practice of the invention are thereafter utilized to reduce amplitude and phase mismatches so as to not limit the performance of the BB SpICa invention disclosed herein. As shown in FIG. 4, such steps/components can include Analog to Digital converters (ADC) 40, 40' and Digital Equalizers 44, 44'.

Accordingly, and as noted above, the pseudo-time delay (TD) element in LO, operating at a single frequency is simply analogous to a phase shift. Consequently, augmenting this PS in LO with a BB TD element, i.e., such as a delay compensating array 30 discussed above, compensates the delay between the received signals. Thus, the BB delay configuration/technique of the present invention removes the frequency-dependent residue phase ($\Delta\varphi_{UD} = 2\pi f \Delta t_{UD}$) that exists in conventional PS-based SpICa schemes. After time-aligning the undesired signals at the BB using delay compensating array 30, SpICa can be performed through the cancellation matrix component 3, often a differential orthogonal matrix, which subtracts half of the signals from the other half uniquely. At the output of the matrix delay compensating array 30, the undesired signal component ($S_{UD}$) is uniformly rejected, as stated above, across BW without substantially any residue compared to the PS-based SpICa, i.e. the invention herein removes angle- and frequency-dependency so as to result in substantially collecting only the desired signals ($S_{UD}$).

Because the delay-compensation at RF is equivalent to its implementation in the BB after the downconversion mixer and a phase shift, the TTD-based beamformer can be realized through delay-compensation in RF or BB as shown in FIG. 5A. Various implementations for the required TTD and phase shift are also shown in FIG. 5B.

Figure 6:
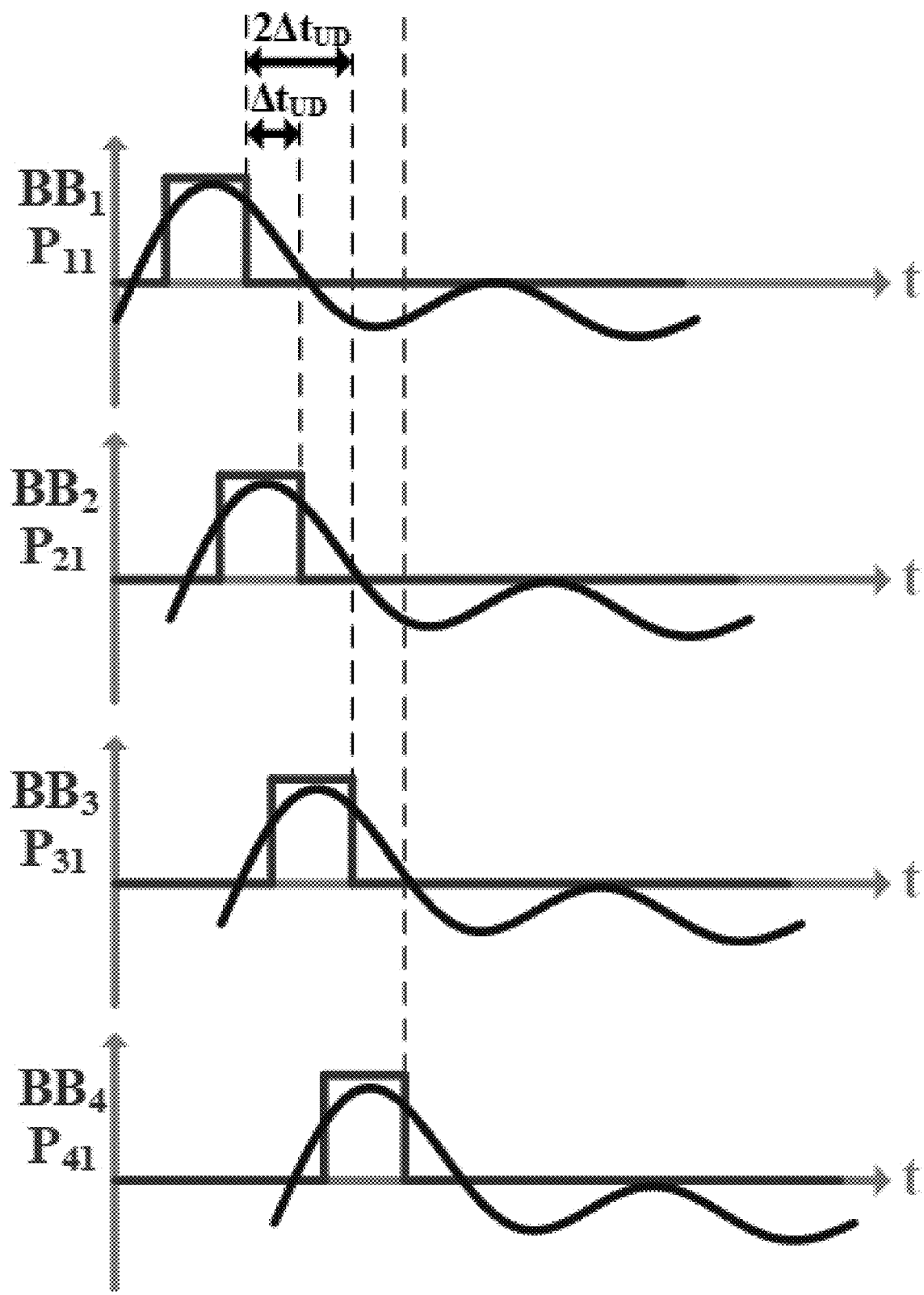
FIG. 6 illustrates non-uniform sampling used to implement TD, as disclosed herein.

The implementation of the delay compensation array 30 of the presented embodiment shown in FIG. 4 as achieved through non-uniform sampling, as illustrated in FIG. 6. The signal received at each antenna in the four-element array is sampled at the delay intervals based on the delay between the antennas. Sampling the BB signals with time-delayed clocks is equivalent to sampling the time-delayed version of those signals with the same clock. Using this discrete technique, the embodiment herein realizes the BB delay compensation array.

The resolution of the delay-compensation elements, which in this discrete TD structure is determined by the resolution of the delay between the sampling clocks, determines the SpICa performance. The longest delay sets the required level of interleaving. As an example, if 8 elements are implemented, the delay between the first and the last antenna increases, for example, up to 35 ns (assuming all the other parameters are not changing). To compensate this new total delay, instead of changing the sampling rate that is determined by the signal bandwidth, we scale the level of interleaving to 8. By doing so, there will be 8 sets of sampling phases and each set consists of 8 interleaved phases.

Figure 7:
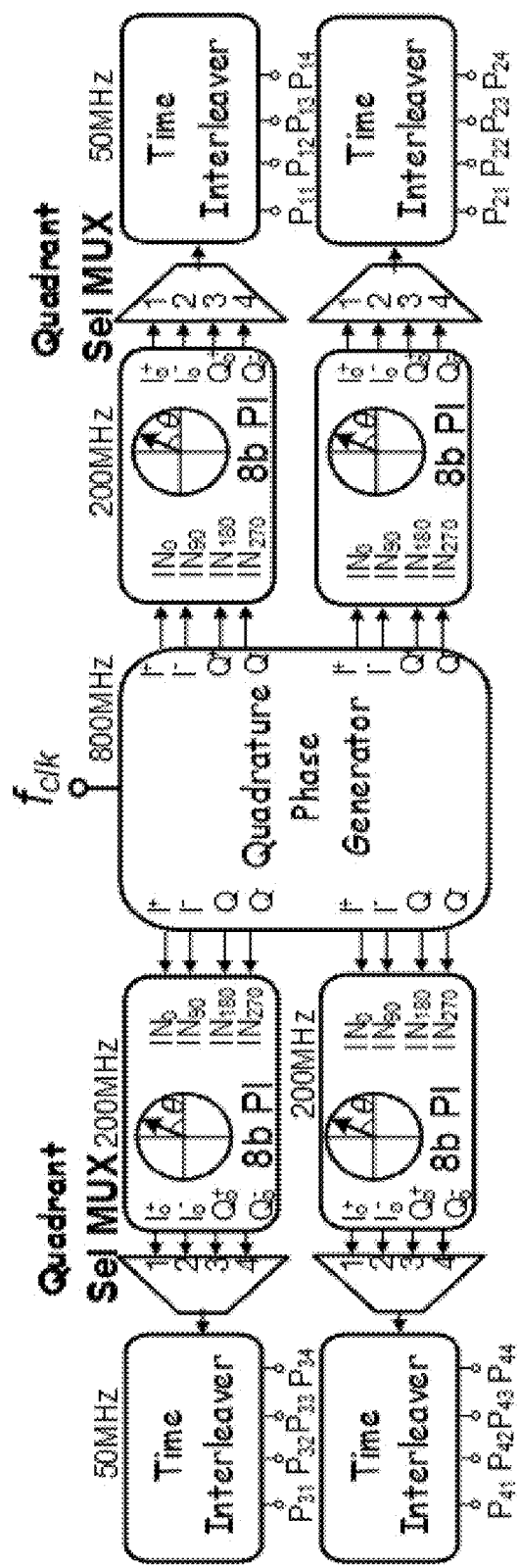
FIG. 7 shows the time-interleaver topology with a 5-ns delay between consecutive antennas and with 5 ps resolution.

Referring to the time-interleaver topology in FIG. 7, such a time-interleaver topology is used to obtain a precision of at least 5 ps and a maximum range of 15 ns, between the first and the last antennas (for an example 4 element array), in the sampling clock phases. The time-interleaver resolution determines the theoretical maximum interference rejection. In the design presented, Nyquist sampling results in a sampling clock frequency 200 MHz (twice of BB BW, 2×100 MHz). The external 800 MHz single-phase clock ($f_{clk}$) is first terminated with a 50Ω on-chip resistor and is fed to a quadrature-phase generator circuit after amplification to rail-to-rail swing.

Figure 8:
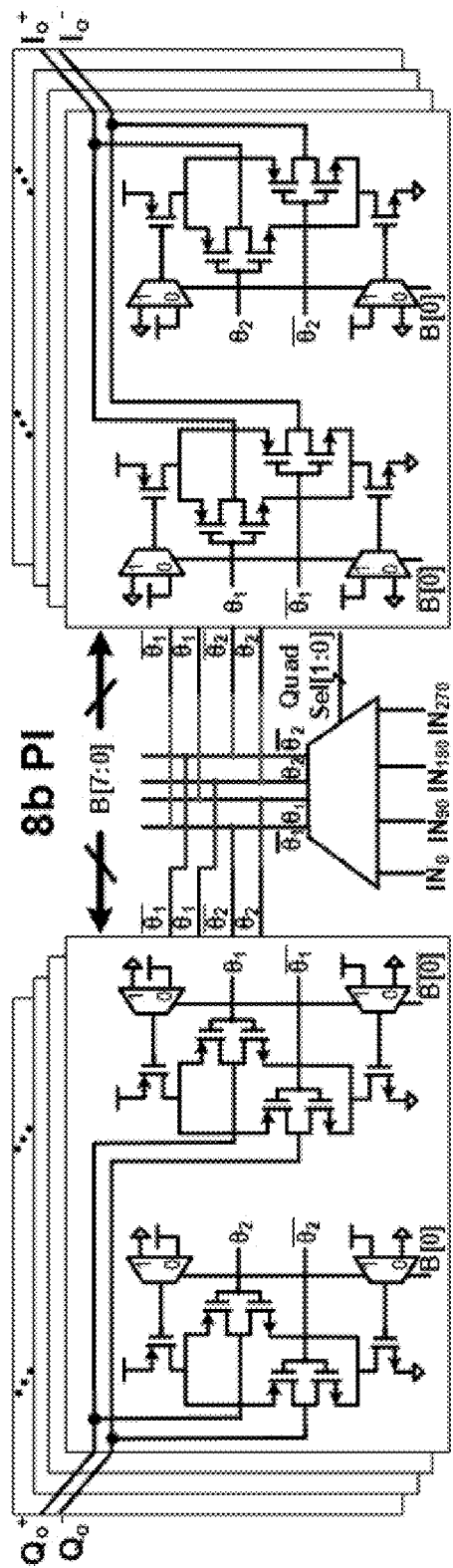
FIG. 8 shows an 8-bit quadrature digital phase interpolator (PI) schematic, as can be utilized herein.

The quadrature-phase generator represented in FIG. 8 provides quadrature outputs ($I^-$, $I^+$, $Q^-$, $Q^+$) at 200 MHz with complete cycle coverage)(=360° and period of $T_s$=5 ns. These quadrature phases are fed to an 8-bit-binary. It is capable of 5 ps resolution (=1.25 ns/256) and has a maximum 5 ns range after the four differential quadrature outputs of the phase interpolator (PI) ($I^-$, $I^+$, $Q^-$, $Q^+$) are selected by digital PI which is programmed using an on-chip serial-to-parallel (SPI).

Figure 9:
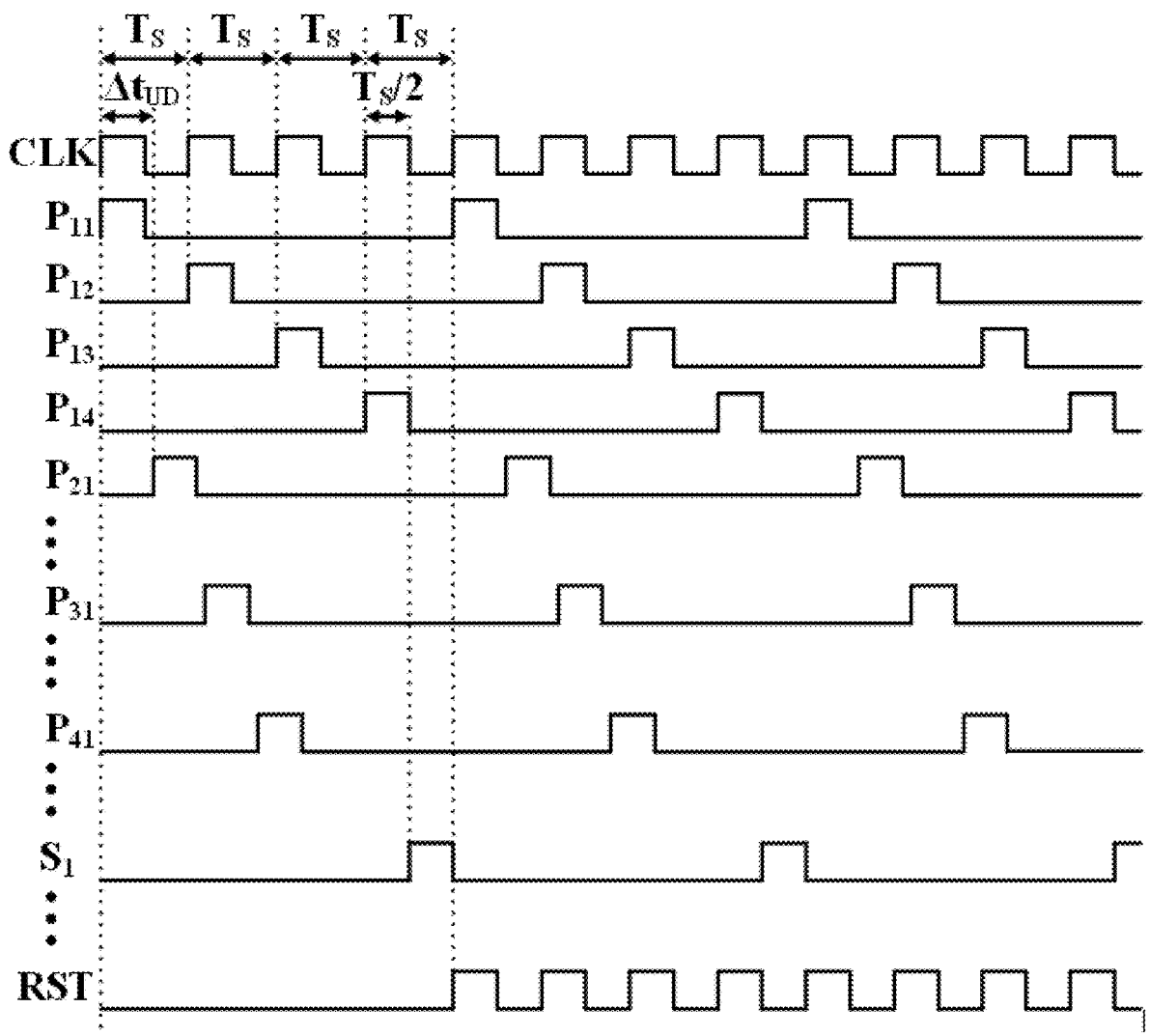
FIG. 9 shows the required phases to span a 15-ns range so as to ensure proper functionality of the discrete TD-based SpICa implementation.

The period of the 200 MHz clock is insufficient to cover the required time span of 15 ns between the first and the last antenna. This is remedied by generating four phases ($P_{11}, \ldots, P_{14}$), from each Q-MUX output, for each quadrant select MUX, at 50 MHz with a 12.5% ON-time from a time interleaver. These 16 phases ($P_{11}, \ldots, P_{44}$) provide the required staggered-time interleaved clocks represented in FIG. 9. A digital implementation with power consumption proportional to $C \cdot VDD^2 \cdot f_{clk}$ permits scaling with CMOS process, VDD and BW. A finer resolution is preferred in improving the consecutive antenna, resulting in 15 ns of the overall range. Such a large range is again chosen to prove that this design can be used in larger arrays, where the delay between received signals at the first and last antenna can be a large value.

Figure 10:
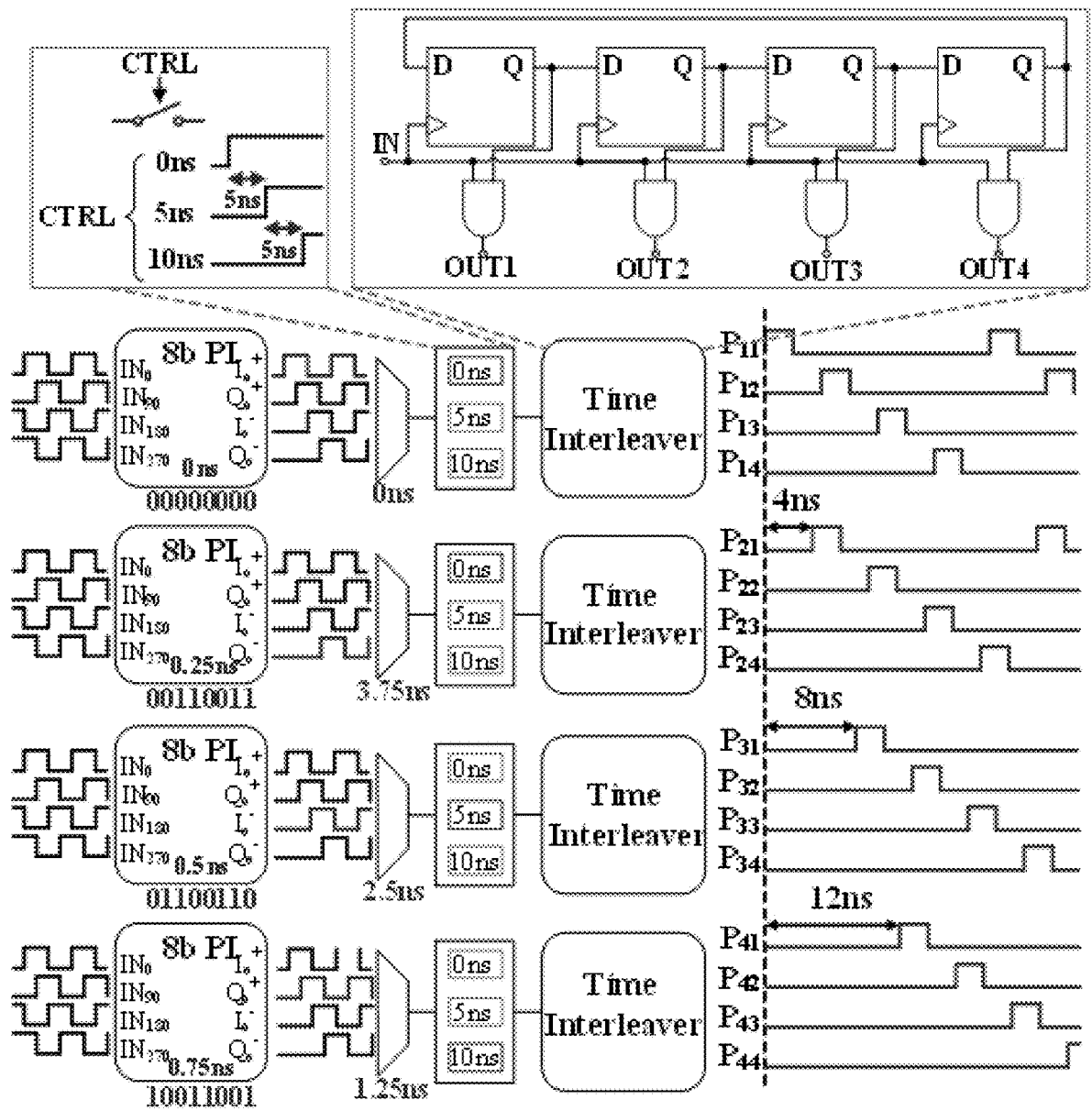
FIG. 10 shows the states of the time-interleaver and important phases for delay compensation of 4 ns between consecutive antennas.

Referring to the state of each PI and MUX in FIG. 10. It is illustrated to generate a delay compensation of 4 ns between consecutive antennas. Each of the four PIs is configured independently using the SPI data bits. The first PI does not interpolate any of the phases generated by the quadrature phase generator preceding the PI. As such, the $I_o^+$ phase is selected by the MUX and fed to the time-interleaver to generate the first set of sampling phases ($P_{11}, \ldots, P_{14}$). These sampling phases are then applied to the first input signal ($BB_1$ in FIG. 11). In order to generate 4 ns of delay for the $2^{nd}$ antenna element, the $2^{nd}$ PI interpolates the input clocks by 0.25 ns. Selecting the $Q_o^-$ phase of the PI by MUX results in 4 ns relative delay (0.25 ns from the PI and 3.75 ns from choosing the $Q_o^-$ phase).

In order to generate 8 ns of delay for the $3^{rd}$ antenna element, the $3^{rd}$ PI interpolates the input clocks by 0.5 ns. Selecting the $I_o^-$ phase of the PI by MUX results in 3 ns relative delay (0.5 ns from the PI and 2.5 ns from choosing the $I_o^-$ phase). Another 5 ns (=$T_S$) of desired relative delay is introduced by enabling the time interleaver only after 5 ns relative to the first two time-interleavers. This relative delay can only be controlled as 0, $T_S$, or $2T_S$, in the current implementation. Finally, a delay of 12 ns is implemented for the $4^{th}$ antenna element.

The implementation of the cancellation array in the embodiment presented in FIG. 4 is included herein. In the four-element array, there are three unique combinations of the time-aligned BB signals to perform SpICa. These three unique combinations construct a 4×3 matrix with only +1 and −1 (antipodal binary coefficients) entry, which can be realized with a truncated Hadamard matrix (THM). THM is tested to be a simpler approach to achieve the 4×3 matrix with only +1 and −1 entries as compared to other transforms. The THM entries are simply constructed through differential implementation and the row's addition is done though charge domain summation.

Figure 11:
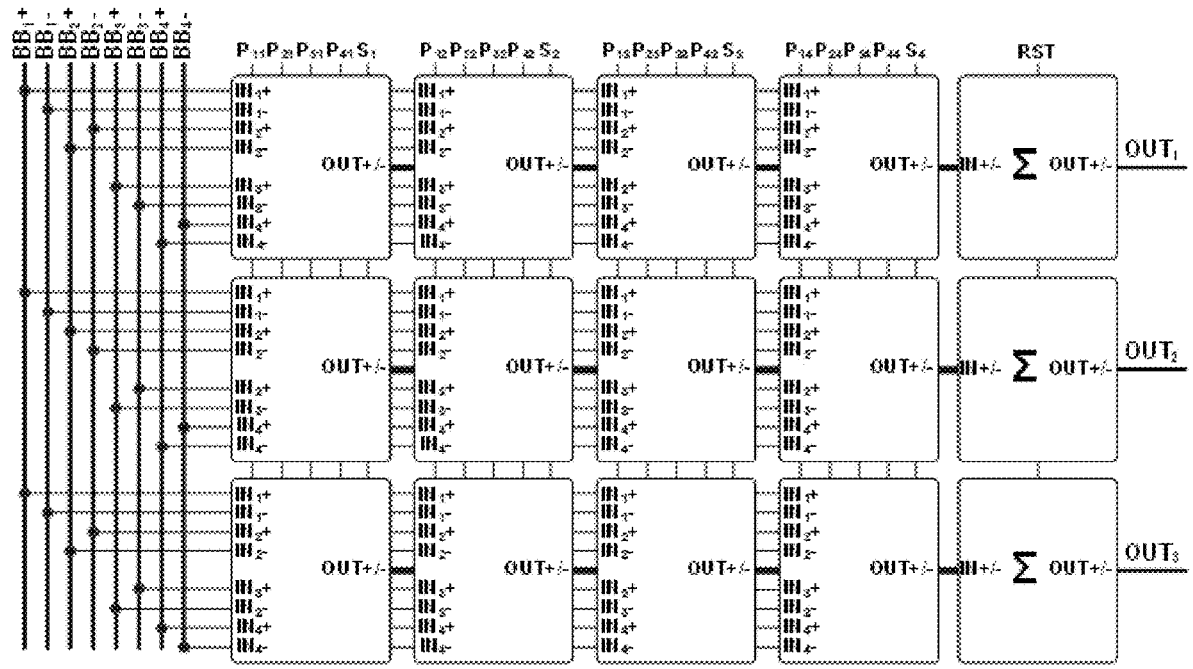
FIG. 11 shows the THM realization through differential analog MAC implementation.

Referring to the analog implementation of the THM in FIG. 11. In this structure, each row of the THM is implemented as an analog multiply-accumulate (MAC), with four multipliers (M1 . . . M4) and one accumulator. Differential implementation is used to simplify THM entries' realization. By simply flipping the polarity of the corresponding inputs to −1, the THM is realized without any extra hardware requirements.

Figure 12:
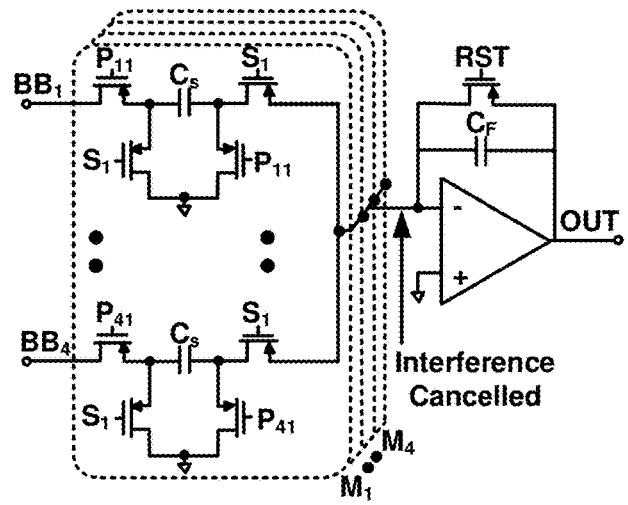
FIG. 12 shows the simplified single-ended representation of THM rows' implementation (Interference cancellation is done at the virtual ground resulting in significantly relaxed linearity requirements).

Multiplications are achieved using the conventional bottom-plate sampling switched-capacitor circuit and accumulation is achieved using a fully-differential operational transconductance amplifier (OTA) based parasitic-insensitive summer (FIG. 12). Each accumulator sums the inputs, delayed and sampled on the four capacitors during the SUM phases ($S_1$ . . . $S_4$). This switched-capacitor based implementation of a BB RX requires four phases for sampling ($P_{1i}$ . . . $P_{4i}$) followed by summation ($S_i$) and reset (RST) phase referred in FIG. 9, in a four-element array.

In the sampling phases, ($P_{1i}$ . . . $P_{4i}$), input signal from each RX is first sampled on a sampling capacitor (CS) uniquely. The input sampler is implemented using a PMOS switch optimized to provide the maximum linearity to handle input signals between 0.4 V-1 V. The value of CS is determined by the noise requirements of the RX. After the last sampling phase ($P_{4i}$), the stored charges on each capacitor are shared in $S_i$ phase. This charge sharing performs an averaging function. To change this functionality to summation, the shared charges are transferred to the feedback capacitor (CF) in a switched-capacitor summer. The OTA used in the adder is designed to satisfy SNR and BW requirements of the RX.

Figure 13:
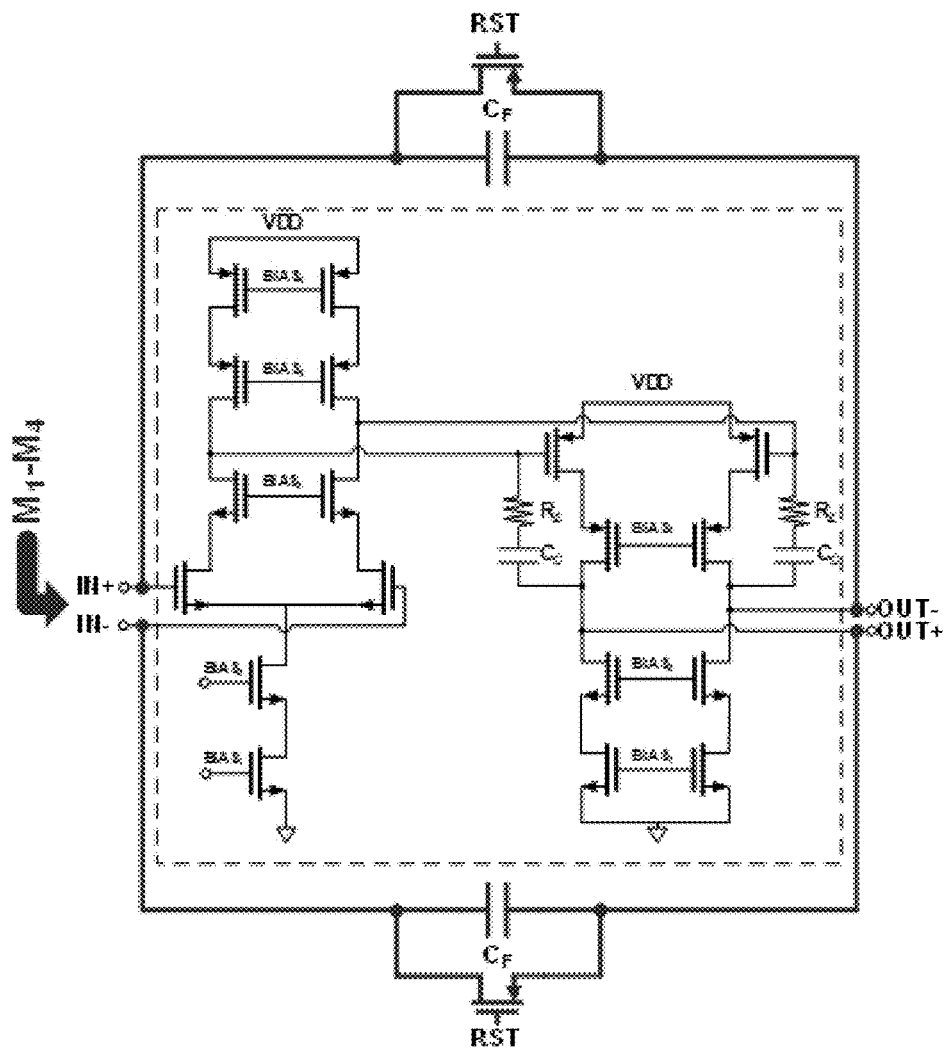
FIG. 13 shows the two-stage internally compensated OTA with the feedback network.

In the RST phase, there is a feedback network on the OTA, with a feedback coefficient of ¼ (consisting of 4 effective sampling capacitors and one feedback capacitor). Considering these requirements, the OTA is implemented as a two-stage internally compensated structure with Miller compensation represented in FIG. 13. The OTA is designed with more than 70 dB open-loop gain, 685 MHz unity-gain bandwidth, and 72° phase margin. These values ensure that the desired cancellation performance is met across the PVT variations. Because the input nodes of the OTA do not vary significantly (virtual ground) and the output nodes just carry the weaker desired signals (the undesired has been rejected), telescopic cascade structure has been used for both stages.

A wide-swing cascade current mirror is used that mirrors the input off-chip bias current (=200 μA) to each of the three OTAs consuming 2 mA at 1V supply. The BW of the common-mode feedback loop is set to be greater than the Nyquist frequency to allow first-order rejection of common-mode noise and interference. The interference cancellation happens prior to summation resulting in significantly reduced linearity requirements for the summer.

The binary (±1) entries in the THM based MACs permit: (i) half of the signal vector to be uniquely combined with the other half; (ii) easy realization through differential implementation without requiring any extra hardware; and (iii) easy scalability to a higher number of elements thus promising low-latency operation. A low-power source-follower buffer consuming 0.25 ns mA is used to drive each MAC output (OUT) for off-chip measurement.

At the output of the THM ($OUT_i(t)$, i=1, 2, 3), the undesired signal is eliminated, and the residue signal (which is only a function of the desired signal) can be written as:

$$OUT(t) = \begin{bmatrix} OUT_1(t) \\ OUT_2(t) \\ OUT_3(t) \end{bmatrix} = \begin{bmatrix} +1 & -1 & +1 & -1 \\ +1 & +1 & -1 & -1 \\ +1 & -1 & -1 & +1 \end{bmatrix} \begin{bmatrix} S_D[t] \\ S_D[t+(\Delta t_{UD} - \Delta t_D)] \\ S_D[t+2(\Delta t_{UD} - \Delta t_D)] \\ S_D[t+3(\Delta t_{UD} - \Delta_D)] \end{bmatrix} \quad (8)$$

Equation (8) can be written in the frequency domain as:

$$OUT(j2\pi f) = \quad (9)$$

$$\begin{bmatrix} OUT_1(j2\pi f) \\ OUT_2(j2\pi f) \\ OUT_3(j2\pi f) \end{bmatrix} = \begin{bmatrix} +1 & -1 & +1 & -1 \\ +1 & +1 & -1 & -1 \\ +1 & -1 & -1 & +1 \end{bmatrix} \begin{bmatrix} S_D(j2\pi f) \\ S_D(j2\pi f)e^{j2\pi f(\Delta t_{UD} - \Delta t_D)} \\ S_D(j2\pi f)e^{j4\pi f(\Delta t_{UD} - \Delta t_D)} \\ S_D(j2\pi f)e^{j6\pi f(\Delta t_{UD} - \Delta t_D)} \end{bmatrix}$$

The desired signal conversion gain vector, $G_D(j2\pi f)$, can be defined as:

$$G_D(j2\pi f) = \frac{OUT(j2\pi f)}{S_D(j2\pi f)} = \begin{bmatrix} G_{D1}(j2\pi f) \\ G_{D2}(j2\pi f) \\ G_{D3}(j2\pi f) \end{bmatrix} = \quad (10)$$

$$\begin{bmatrix} 1 - e^{j2\pi f(\Delta t_{UD} - \Delta t_D)} + e^{j4\pi f(\Delta t_{UD} - \Delta t_D)} - e^{j6\pi f(\Delta t_{UD} - \Delta t_D)} \\ 1 + e^{j2\pi f(\Delta t_{UD} - \Delta t_D)} - e^{j4\pi f(\Delta t_{UD} - \Delta t_D)} - e^{j6\pi f(\Delta t_{UD} - \Delta t_D)} \\ 1 - e^{j2\pi f(\Delta t_{UD} - \Delta t_D)} - e^{j4\pi f(\Delta t_{UD} - \Delta t_D)} + e^{j6\pi f(\Delta t_{UD} - \Delta t_D)} \end{bmatrix}$$

Figure 14:
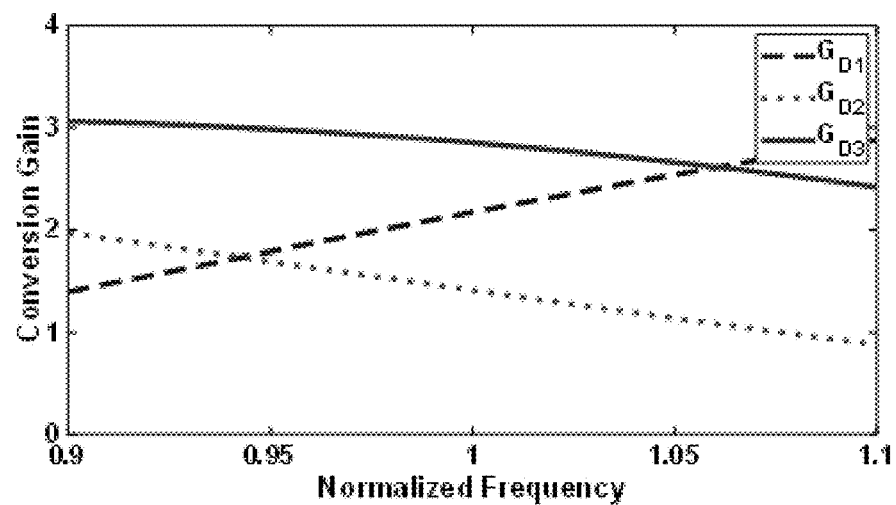
FIG. 14 shows the desired signal conversion gain vs. normalized frequency over 20% fractional BW in the presented SpICa scheme disclosed herein.

The transfer function profile for each of the signal paths in equation (10) depends on the difference between desired and undesired signals. The desired signal is affected by a known frequency-dependent profile that can be equalized after digitization. Referring to the plot of the conversion gains vs. normalized frequency in FIG. 14 for a signal occupying a BW equivalent to 20% of the center frequency. In this simulation, for AoA=45°, the conversion gains for almost the entire band are more than one and their frequency dependency profiles are further compensated by a digital equalizer post ADC.

Examples

Discrete-Time Delay-Compensating Element for an N-Element Beamformer

Figure 15:
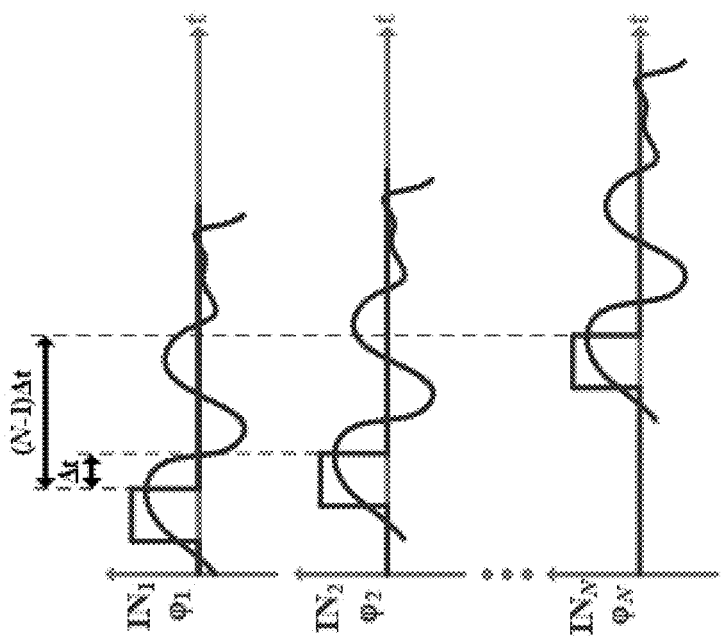
FIG. 15 shows the sampling-based discrete-time delay compensation for different number of antenna elements (N).
Figure 16:
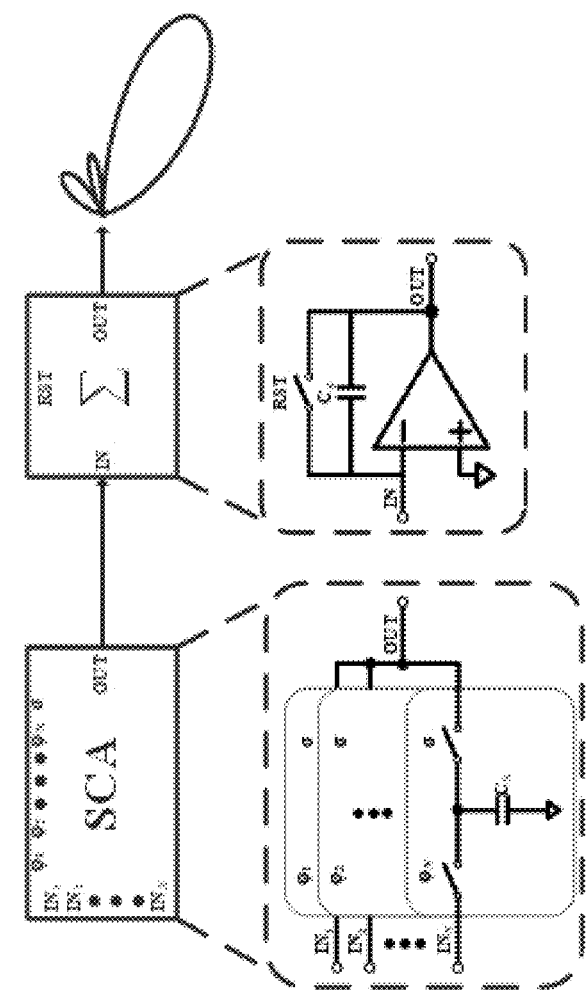
FIG. 16 shows an example of a sampling switched-capacitor array (SCA) and adder.
Figure 18:
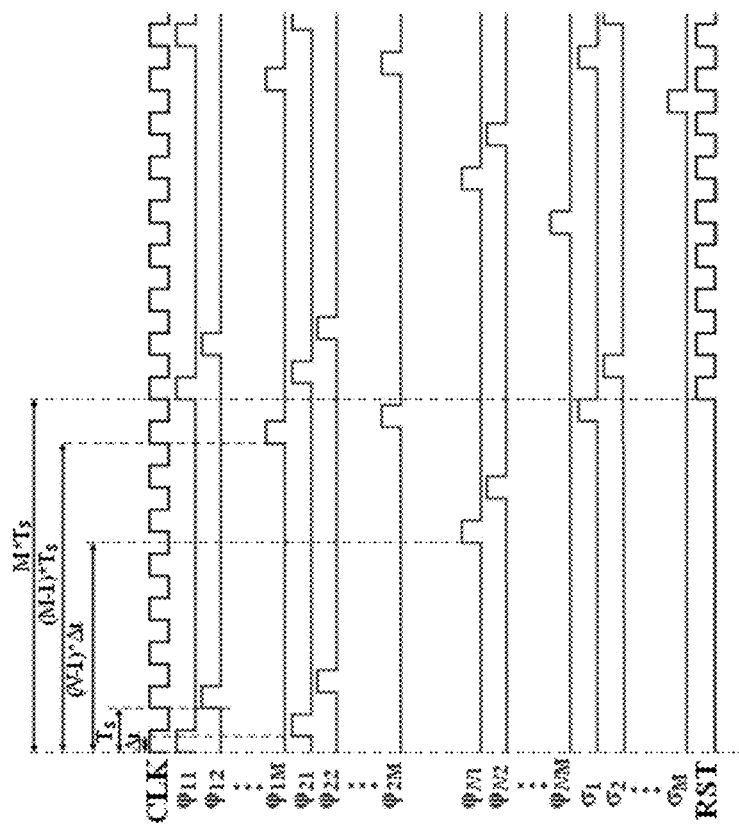
FIG. 18 shows an example timing diagram of different required clocks for the embodiments herein.
Figure 17:
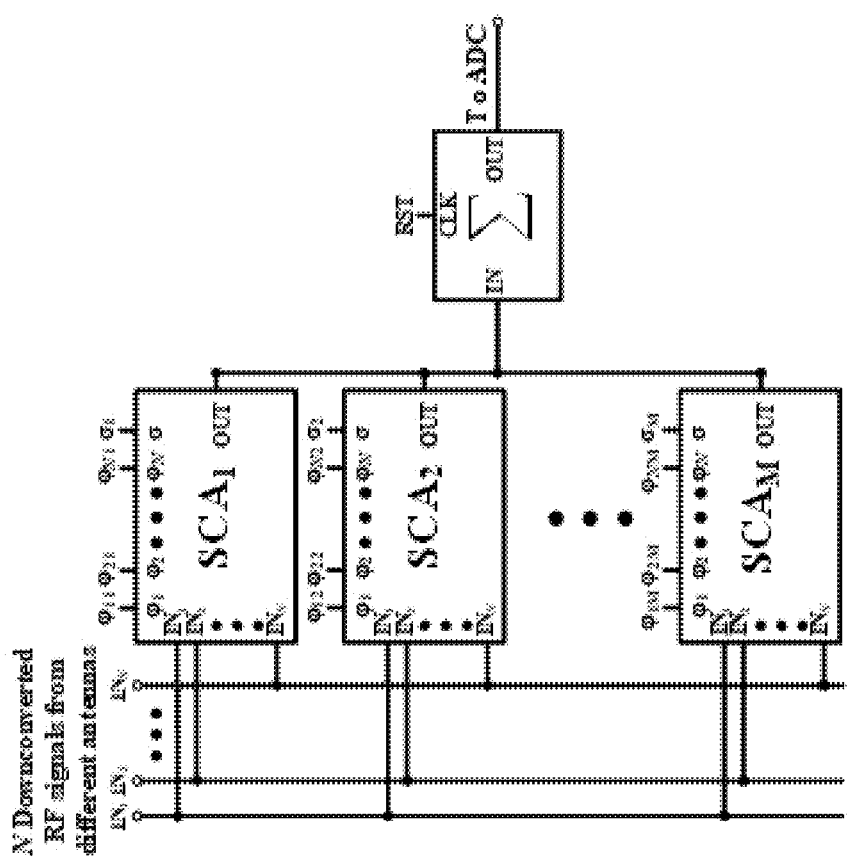
FIG. 17 shows an example system diagram of an analog delay-compensation element for embodiments herein.
Figure 19:
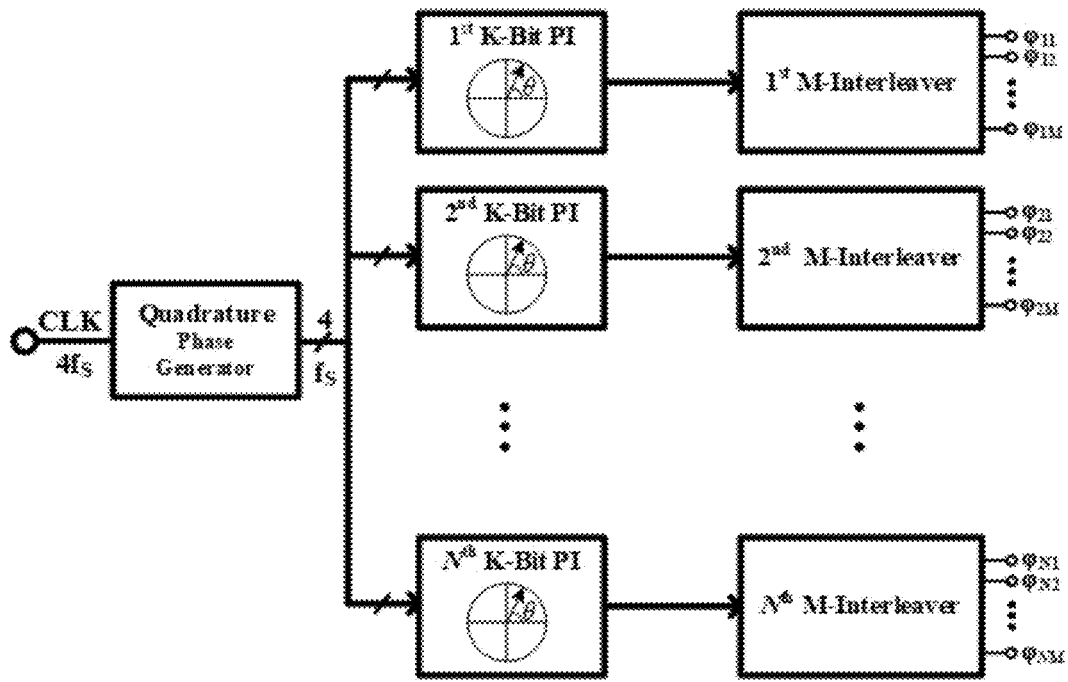
FIG. 19 shows a clock generation unit for different number of antenna elements (N).

Referring to the discrete-time delay compensation technique in FIG. 15 where the down-converted and phase-shifted signals from N antennas are sampled at different time instants using a switched-capacitor array (SCA). The switched-capacitor array and adder are further extended for N antennas as represented in FIG. 16. The switched-capacitor based implementation of a beamformer requires N phases for sampling ($\varphi_1 \ldots \varphi_N$) followed by addition (a) and reset (RST) phase, in an N-element array. FIG. 17 shows the overall implementation of a discrete-time delay compensation beamformer for an N-element antenna array. The required phases in this architecture with an interleaving factor of M is shown in FIG. 18. To generate these required phases, a clock generation unit for the discrete-time delay-compensating element utilized herein is represented in FIG. 19. Further time delay and cancellation processes are carried out extending the process and design of a four-element array.

Generalized Design Methodology for an N-Element Analog Beamformer with a Single-ADC The maximum time delay in an N-element antenna array is the delay between the received signals at the first and the last ($N^{th}$) antenna. This time delay is expressed as:

$$\Delta t_{max} = (N-1) \cdot \Delta t \vert_{\theta=-90 \text{ or } 90} = (N-1) \cdot \frac{d}{\lambda_C} \cdot \frac{1}{f_C} \quad (11)$$

$\Delta t_{max}$ is compensated through the time-interleaved implementation with an interleaving factor of M. At the same time, the maximum delay compensation ($T_{C-max}$) achieved in this architecture can be written as:

$$T_{C-max} = (M-1) \cdot T_s = \frac{M-1}{f_s} \quad (12)$$

where $T_s$ and $f_s$ are the reference clock period and sampling frequency respectively. To achieve optimal functionality and cover the entire 180° range, $T_{C-max}$ should be larger than $\Delta t_{max}$ resulting in:

$$T_{C-max} \geq \Delta t_{max} \rightarrow T_s \geq \frac{(N-1)}{(M-1)} \cdot \frac{d}{\lambda_C} \cdot \frac{1}{f_C} \quad (13)$$

Considering a low-IF RX architecture, the downconverted signal covers the frequency range of DC to BW. Perfect sampled signal reconstruction within this BW must satisfy the Nyquist condition as follows:

$$f_s \geq 2*BW \rightarrow T_s \leq \frac{1}{2*BW} \quad (14)$$

Substituting (13) in (14) yields the following:

$$\frac{(N-1)}{(M-1)} \cdot \frac{d}{\lambda_C} \cdot \frac{1}{f_C} \leq \frac{1}{2*BW} \quad (15)$$

$$M \geq 1 + \left(\frac{d}{\lambda_C/2}\right) \cdot (N-1) \cdot \left(\frac{BW}{f_C}\right)$$

For any N-element antenna array with antenna spacing d, and fractional bandwidth $BW/f_C$, the relationship between the required sampling frequency ($f_S$) and the interleaving factor (M) in an analog delay-compensation architecture is:

$$f_S = 2*BW \quad (16)$$

$$M = 1 + \left\lceil \left(\frac{d}{\lambda_C/2}\right) \cdot (N-1) \cdot \left(\frac{BW}{f_C}\right) \right\rceil \quad (17)$$

where [ . . . ] is the ceiling function to find the smallest integer M that satisfies (15).

Figure 20:
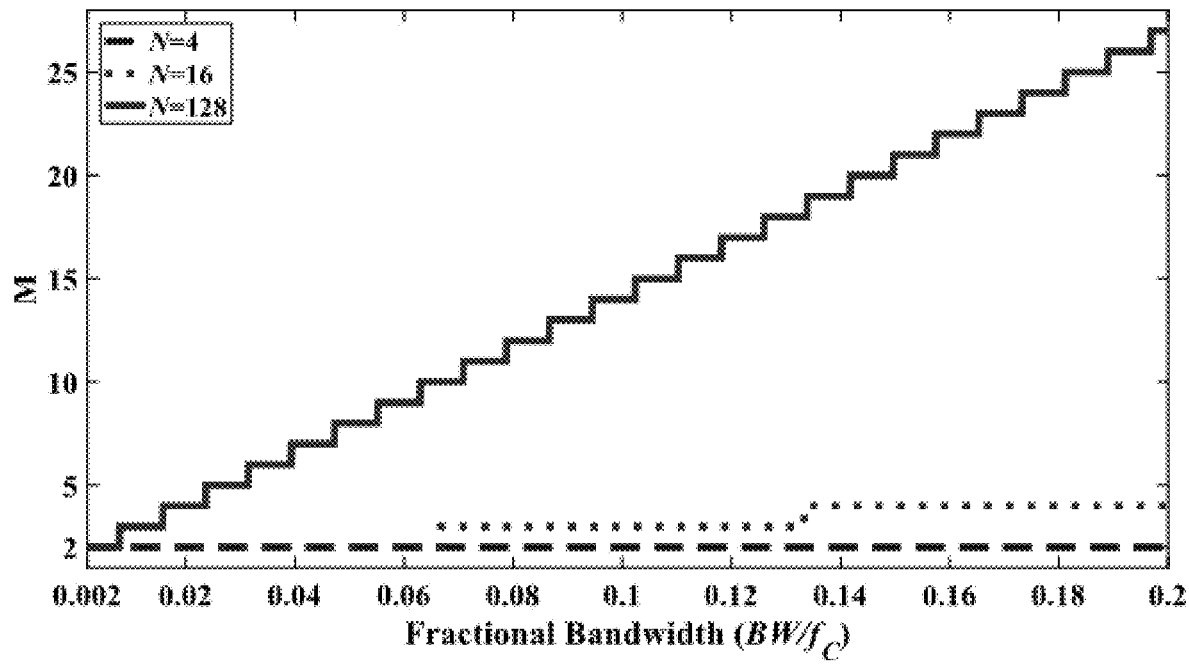
FIG. 20 shows the relation of interleaving factor (M) with fractional bandwidth for different number of antennas (N) in an analog discrete-time delay compensation beamformer.
Figure 21B:
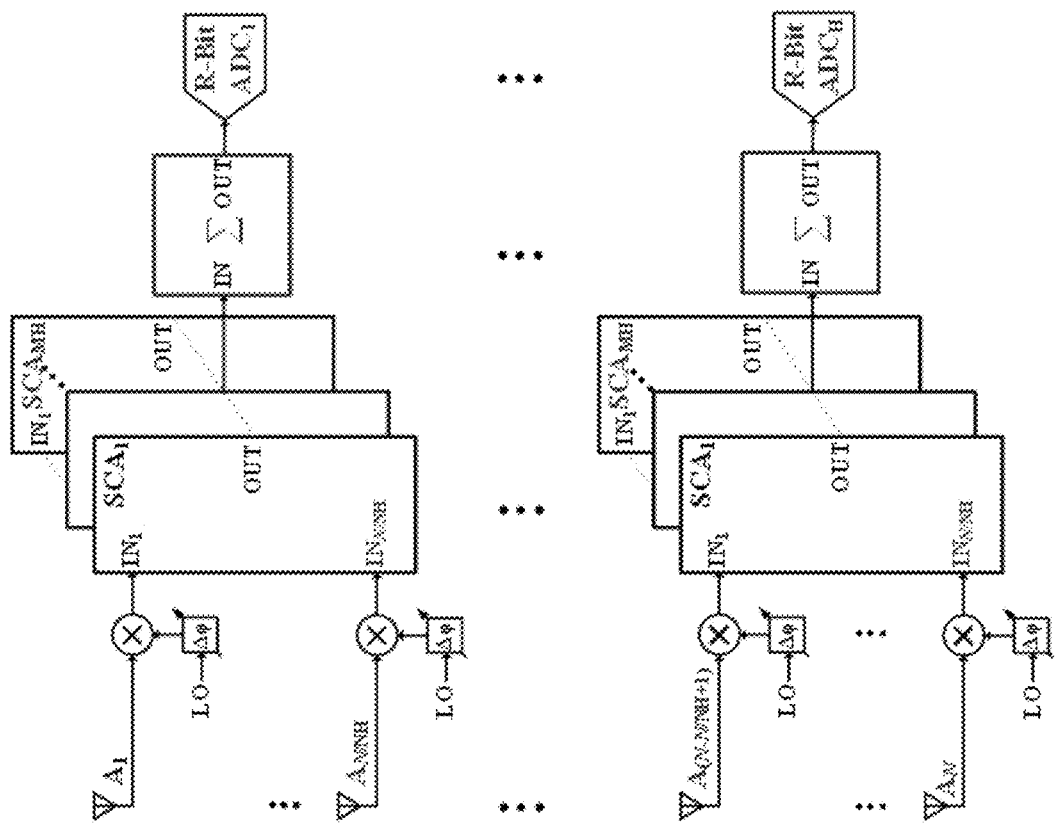
FIG. 21B shows the analog discrete-time delay compensation implementation for hybrid beamformer.
Figure 21A:
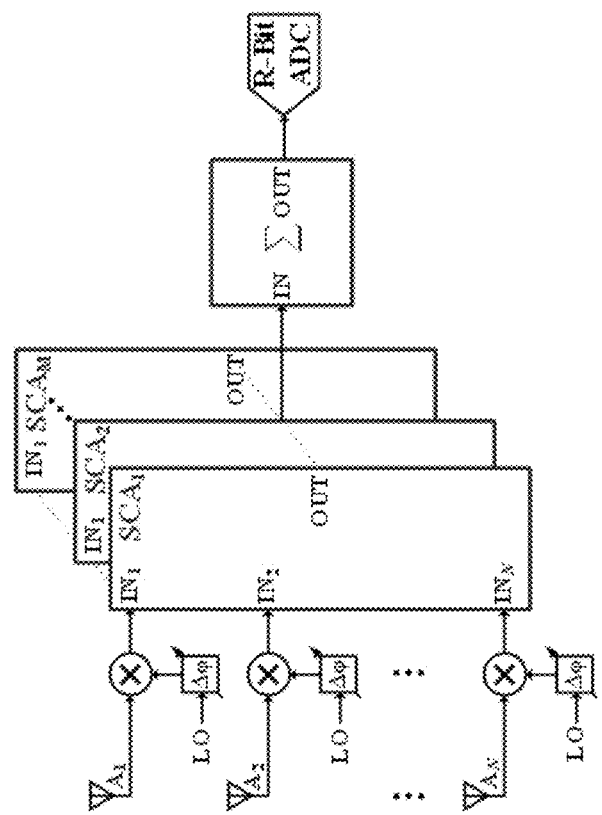
FIG. 21A shows the analog discrete-time delay compensation implementation for analog beamformer.

The required interleaving factor for three different number of antennas (N=4, 16, 128) is plotted against fractional bandwidths in FIG. 20. For a smaller number of antennas or lower fractional bandwidths, the interleaving factor can be set equal to the minimum value (M=2). As the number of antenna or fractional bandwidth increases, the required interleaving factor increases too as given by (17). The power consumption and occupied area to realize the delay-compensation based analog beamformer represented in FIG. 21A with the sampling frequency of $f_S$ and ADC resolution of R-Bit. The DC gain ($A_0$) and the unity-gain bandwidth ($\omega_0$) requirements of the OTA used in the SCA are:

$$A_0 \geq N \cdot 2^{R+1} \quad (18)$$

$$\omega_u \geq 2*\ln(2)*N \cdot (R+1)f_S \quad (19)$$

It is observed in (18) and (19) that both the unity-gain bandwidth and gain are directly proportional to the number of antenna elements. Neglecting parasitic elements, second-order effects, and considering a two-stage internally-compensated OTA, the transconductance of this OTA can be designed to be linearly dependent to the DC current. As a result, the DC gain of the OTA is independent of the DC current and its power consumption ($P_{OTA}$). At the same time, the unity-gain bandwidth is a linear function of the OTA transconductance, and thus varies proportionally to POTA. Further, as the transistors' width is designed to proportionally depend on the DC current (to make OTA's transconductance linearly dependent to the DC current), the OTA area ($S_{OTA}$) can also be approximated as a linear function of POTA. Given these assumptions, the minimum requirement on the OTA unity-gain bandwidth from (19) results in linear dependency of $P_{OTA}$ and $S_{OTA}$ to the product of the number of antennas and sampling frequency, as shown:

$$P_{OTA} \approx P_{OTA0} \cdot N \cdot f_S$$

$$S_{OTA} \approx S_{OTA0} N \cdot f_S \quad (20)$$

where $P_{OTA0}$ and $S_{OTA0}$ are power consumption and area of an OTA designed for a single-element array with a unit sampling frequency (1 Hz).

The area of the SCA, $S_{SCA}$ is dictated by the sampling capacitors, $C_s$ and can be approximated as a linear function of N and $C_S$ as shown below:

$$S_{SCA} \approx S_{C0} \cdot N \cdot C_S \quad (21)$$

where $S_{C0}$ is the area of unit capacitance in the technology. The total area of all the SCAs ($S_{\Sigma SCA}$) can be derived as:

$$S_{\Sigma SCA} \approx S_{C0} \cdot (N \cdot M \cdot C_S + C_F) \xrightarrow{C_S = C_F = C} S_{\Sigma SCA} \approx S_{C0} \cdot (N \cdot M + 1) \cdot C \quad (22)$$

In the embodiment presented herein, the PI is a dominant contributor to the overall area and power consumption and hence, merits careful attention in the system-level design considerations. The clock power ($P_{CLK}$) and area ($S_{CLK}$) can be approximated as:

$$P_{CLK} \approx P_{K-PI0} \cdot N \cdot f_S$$

$$S_{CLK} \approx S_{K-PI0} \cdot N \quad (23)$$

where $P_{K-PI0}$ and $S_{K-PI0}$ are power consumption at the unit frequency of 1 Hz and area of a K-Bit PI clocking, respectively.

As seen in (18), (19), and (20), the requirement for OTA DC gain and unity-gain bandwidth (both proportional to N) can demand stringent design requirements for larger arrays which may not even be feasible. Thus, analog beamforming, while efficient with a single-ADC, may not be suitable for larger arrays in mm-wave Massive-MIMO applications. As an alternative, hybrid beamforming represented in FIG. 21B relaxes the requirements. In hybrid implementation, the array is divided into $N_H$ sub-arrays. Analog beamforming is performed on each sub-array and sub-arrays' beams are fed to digital beamforming, where the TTD is implemented in digital domain. By substituting $N/N_H$ with N in (17), where $N_H$ is the number of ADCs, the new interleaving factor ($M_H$) can be rewritten as:

consumption from the PIs. However, the equivalent increase in the ADCs by a factor of N adds significant power/area penalty. Note that in this paper we assume that the data conversion dynamic range is limited to in-band interference power and consequently the ADC resolution is constant, independent from beamformer implementation. Table 1 shown below compares the analog/hybrid/digital beamforming implementations, in terms of estimated power consumption and area (ignoring second-order effects) and provides guidelines to choose the most suitable beamformer implementation.

TABLE 1

|  | Analog | Hybrid | Digital |
| --- | --- | --- | --- |
| $P_{OTA}$ | $P_{OTA0} \cdot N \cdot f_S$ | $P_{OTA0} \cdot (N/N_H) \cdot f_S$ | $P_{OTA0} \cdot f_S$ |
| $S_{OTA}$ | $S_{OTA0} \cdot N \cdot f_S$ | $S_{OTA0} \cdot (N/N_H) \cdot f_S$ | $S_{OTA0} \cdot f_S$ |
| # OTA | 1 | $N_H$ | N |
| # PI | N | $N/N_H$ | 0 |
| # ADC | 1 | $N_H$ | N |
| Overall Power | $P_{OTA0} \cdot N \cdot f_S + P_{K\text{-}PI0} \cdot N \cdot f_S + P_{R\text{-}ADC}$ | $P_{OTA0} \cdot N \cdot f_S + (N\backslash N_H) \cdot P_{K\text{-}PI0} \cdot f_S + N_H \cdot P_{R\text{-}ADC}$ | $P_{OTA0} \cdot N \cdot f_S + N \cdot P_{R\text{-}ADC}$ |
| Overall Area | $S_{OTA0} \cdot N \cdot f_S + S_{C0} \cdot (N \cdot M + 1) \cdot C + N \cdot S_{K\text{-}PI0} + S_{R\text{-}ADC}$ | $S_{OTA0} \cdot N \cdot f_S + S_{C0} \cdot \dfrac{N \cdot M \cdot C}{N_H} + (N/N_H) \cdot S_{K\text{-}PI0} + N_H \cdot S_{R\text{-}ADC}$ | $S_{OTA0} \cdot N \cdot f_S + N \cdot S_{R\text{-}ADC}$ |

$$M_H = 1 + \left\lfloor \left(\frac{d}{\lambda_C/2}\right) \cdot \left(\frac{N}{N_H} - 1\right) \cdot \left(\frac{BW}{f_C}\right) \right\rfloor \quad (24)$$

In hybrid beamforming, as the number of ADCs are increased to $N_H$, the OTA requirements, in (18) and (19), will equivalently relax by an $N_H$ factor and will be the same in requirements as in the case of number of antennas being $N/N_H$ (assuming $N/N_H$ is an integer). This relaxation causes the overall power consumption and area of the OTAs to be approximately the same as that of an analog beamformer, expressed in (20). The above analysis is further expanded to compute the area requirements of hybrid delay-compensating beamformer. Corresponding to each ADC/OTA, there are $M_H$ SCAs with N/NH inputs. Using (21), the capacitive area in hybrid time compensation beamformer ($S_{\Sigma SCAH}$) can be written as (25). For small values of $N_H$, the area occupied by the SCA capacitors in the hybrid delay-compensating beamformer can be approximated to be the same as analog delay-compensating beamformer over $N_H$.

$$S_{\Sigma SCAH} \approx N_H \cdot S_{C0} \cdot \left(\frac{N}{N_H} \cdot M_H + 1\right) \cdot C \approx S_{C0} \cdot N \cdot M_H \cdot C \xrightarrow{M_H \approx M/N_H} \quad (25)$$

$$S_{\Sigma SCAH} \approx S_{C0} \cdot \frac{N \cdot M \cdot C}{N_H}$$

Figure 22A:
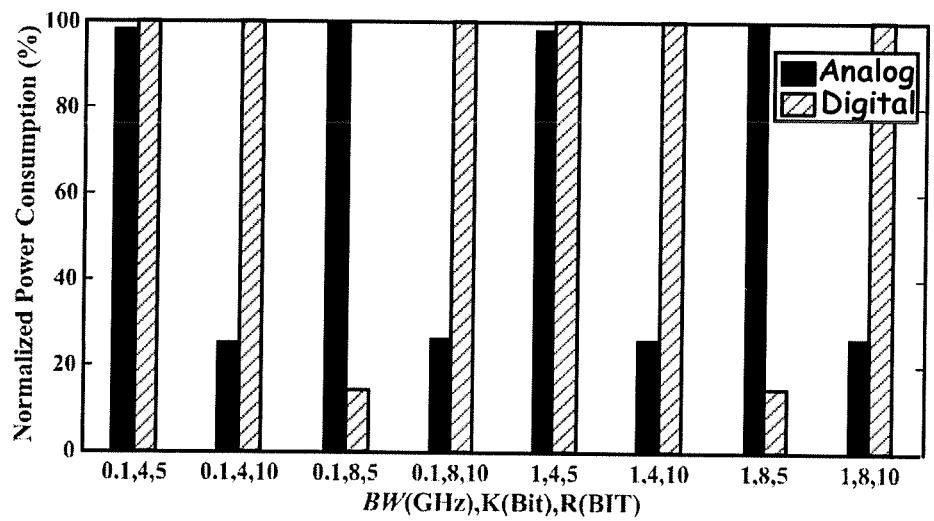
FIG. 22A shows a comparison of normalized power consumption against different combinations of bandwidth (BW), PI resolution (K), and ADC resolution (R) for (a) N antennas (elements)=4, assuming power consumed in a 65 nm CMOS process for 8-bit PI as 44 mW/200 MHz, 5-bit OTA as 3 mW/4 Inputs/100 MHz, and 5-bit ADC as 1.2 mW/250 MHz.
Figure 22B:
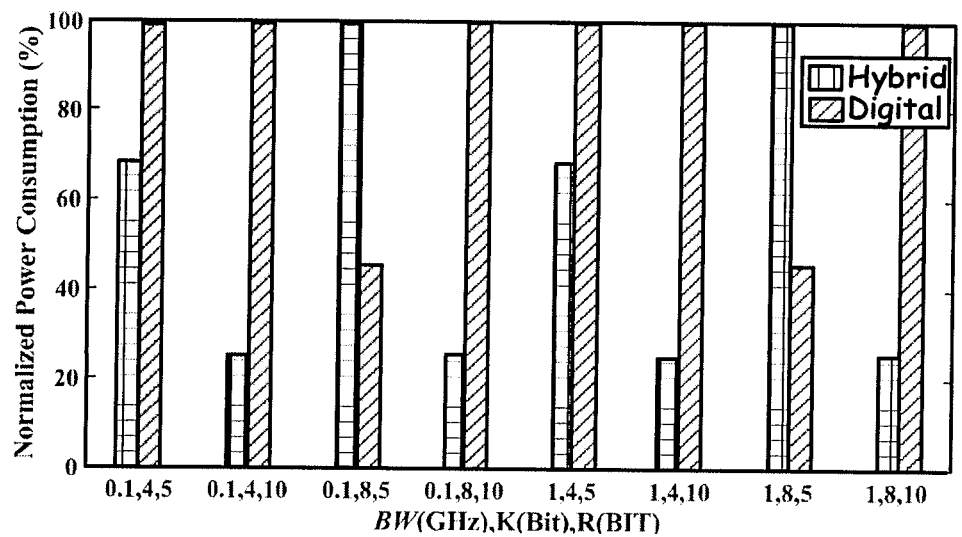
FIG. 22B shows a comparison of normalized power consumption against different combinations of bandwidth (BW), PI resolution (K), and ADC resolution (R) for (a) N antennas (elements)=16, assuming power consumed in a 65 nm CMOS process for 8-bit PI as 44 mW/200 MHz, 5-bit OTA as 3 mW/4 Inputs/100 MHz, and 5-bit ADC as 1.2 mW/250 MHz.
Figure 22C:
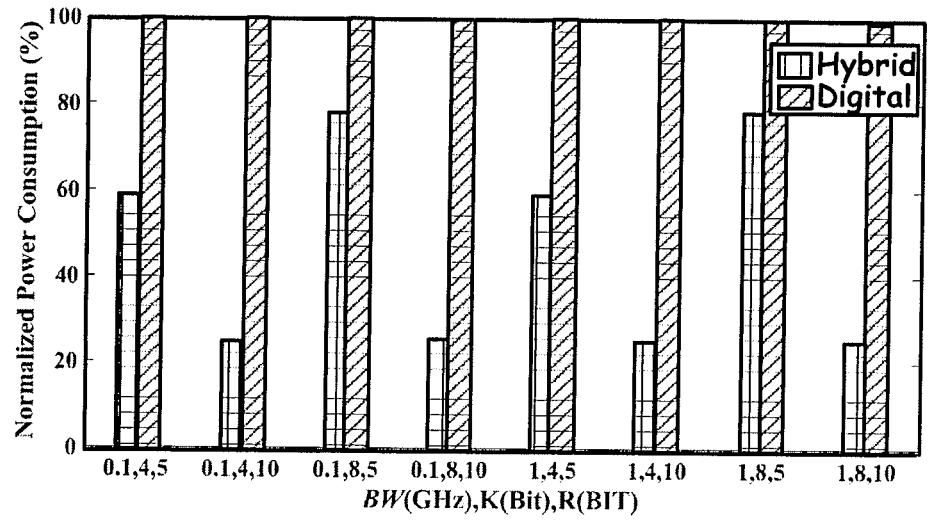
FIG. 22C shows a comparison of normalized power consumption against different combinations of bandwidth (BW), PI resolution (K), and ADC resolution (R) for (a) N antennas (elements)=128, assuming power consumed in a 65 nm CMOS process for 8-bit PI as 44 mW/200 MHz, 5-bit OTA as 3 mW/4 Inputs/100 MHz, and 5-bit ADC as 1.2 mW/250 MHz.

The hybrid beamforming architecture reduces the number of the PIs to N/NH and also relaxes $P_{CLK}$ and $S_{CLK}$ compared to that of an analog beamformer by a factor of $N_H$. However, the number of ADCs correspondingly increases by $N_H$ leading to an increase in the overall area/power of the ADCs by $N_H$. Digital beamformer can be seen as a hybrid beamformer with N ADCs ($N_H$=N). In this case, there will be N OTAs (used in the sample and hold circuit prior to the ADC) with total area ($S_{OTA}$) and power consumption ($P_{OTA}$) similar to that in an analog delay-compensating beamformer. Because there is no analog delay-compensation, no PIs are required in digital beamforming, saving the area/power As shown in Table 1 above, the digital post-processing power and area is not accounted, thereby favoring the digital beamformer, since the entire TTD has to be implemented in the digital domain Normalized power consumption in analog/hybrid implementation and digital implementation, for 24 scenarios, are compared in FIG. 22A, FIG. 22B, and FIG. 22C. FIG. 22A, in particular, shows the comparison for 4 elements, FIG. 22B shows the comparison for 16 elements, and FIG. 22C shows the comparison for 128 elements. For the baseline power consumption for different circuits assumed in FIGS. 22A, B and C, such figures show that for higher ADC resolution (R), digital beamforming power consumption is much higher than corresponding analog/hybrid implementation. However, for lower ADC resolutions, the dominating factor is the PI resolution (K). The ADC power is assumed to increase linearly with sampling frequency and 4× for every additional bit increase in the resolution.

Measurement Results

Figure 23:
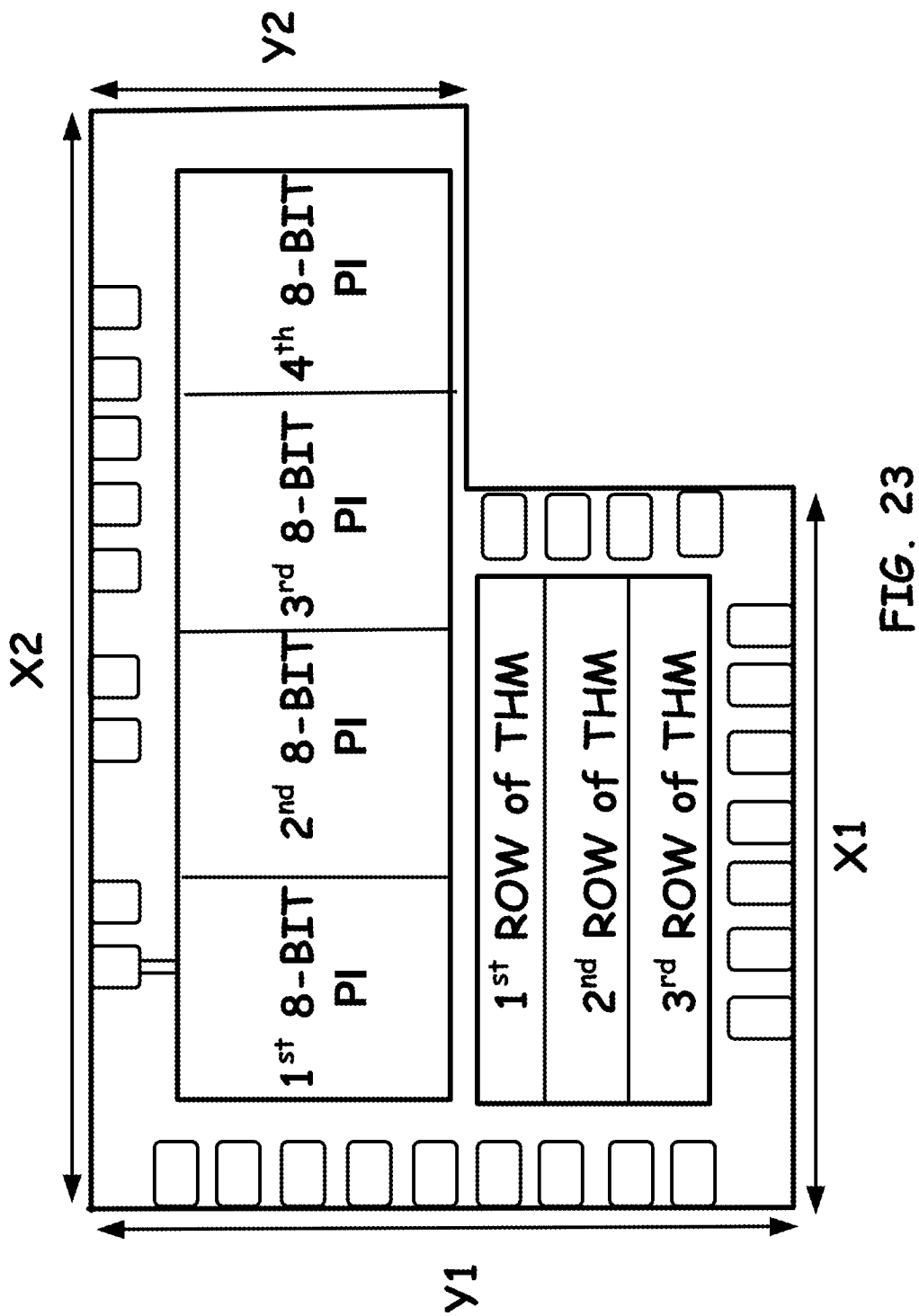
FIG. 23 shows a 4-element MIMO BB RX implemented in a 65 nm CMOS process in an area of 0.65 and 0.9 mm2 without and with pads
Figure 24:
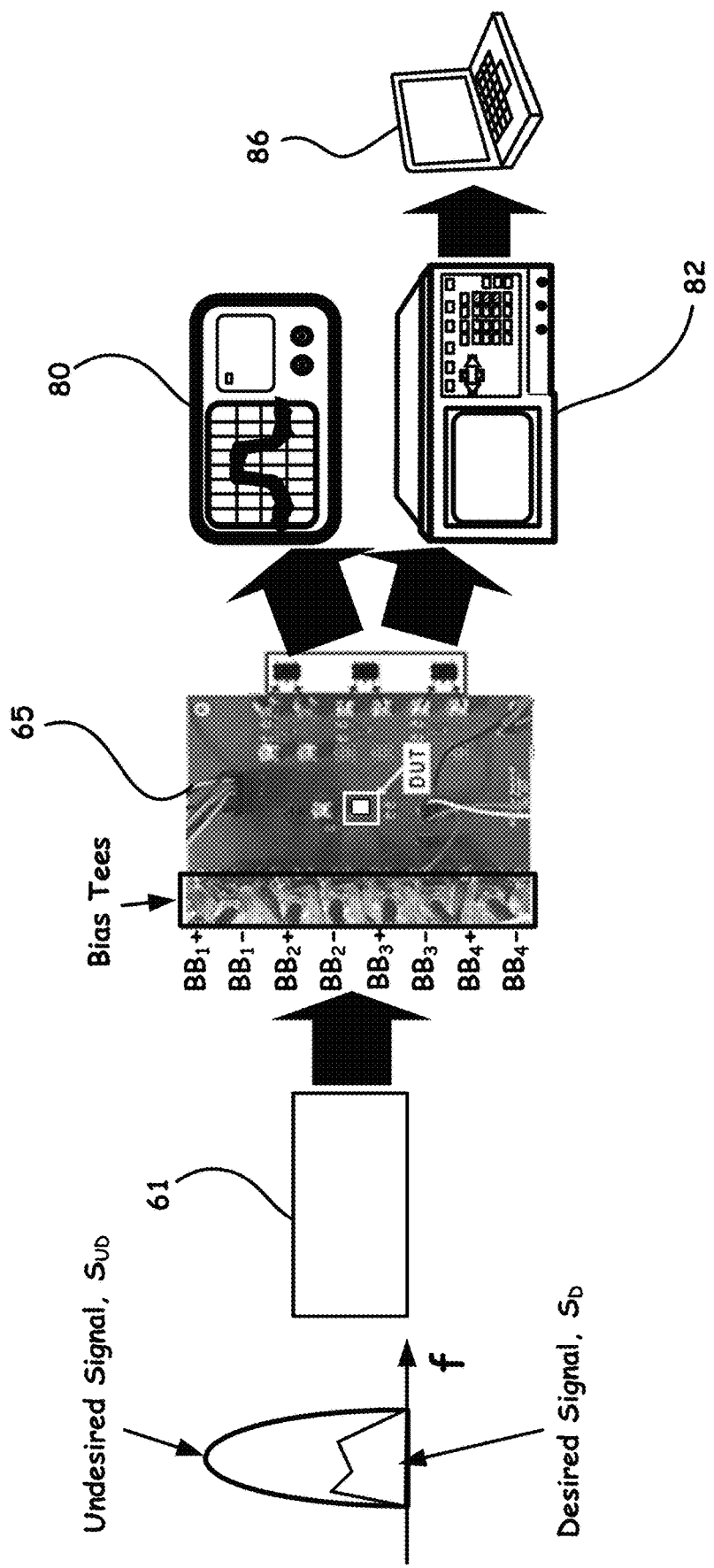
FIG. 24 shows a test setup to demonstrate the working properties of the invention herein.

Referring to FIG. 23 represents an example 4-element MIMO BB RX implemented in a 65 nm CMOS process in an area of 0.65 and 0.9 mm² without and with pads, respectively. The prototype is packaged in a Quad-Flat Package (QFP) enclosure to minimize parasitic bond wires. An SPI control port is used to set the on-chip digital phase-interpolation and time-interleaving. The delays between the RX antenna signals is implemented through two NI PXIe-5450 AWGs with four differential outputs and 145 MHz modulation BW as shown in the test setup in FIG. 24. In particular, FIG. 24 shows the test setup with Wideband (WB) undesired ($S_{UD}$) and desired signals ($S_D$) being MATLAB generated and directed into Bias Tees (configured on a PC board 65) resulting from an instrument 61 (e.g., a National Instruments PXI-5450E configured for 8 outputs (denoted as $BB_1+$, $BB_1-$, etc.)) wherein both single-tone and modulated signals are applied as inputs to characterize the SpICa using conventional instruments, such as spectrum analyzers 80, oscilloscopes 82, and processors 85 (shown as a computer/laptop capable of offline computation in MATLAB).

Figure 25A:
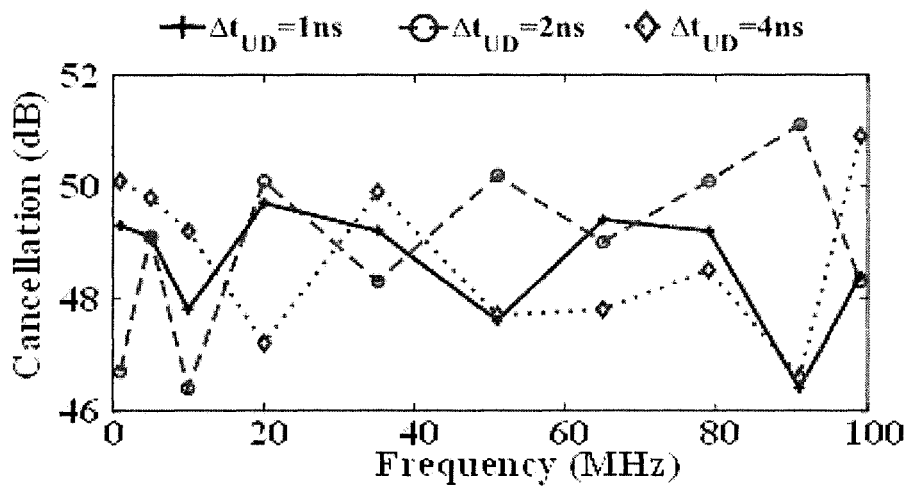
FIG. 25A shows a plot of measurement results of the single-tone undesired signal SpICa performance vs. frequency for three cases of $\Delta t_{UD}$.
Figure 25B:
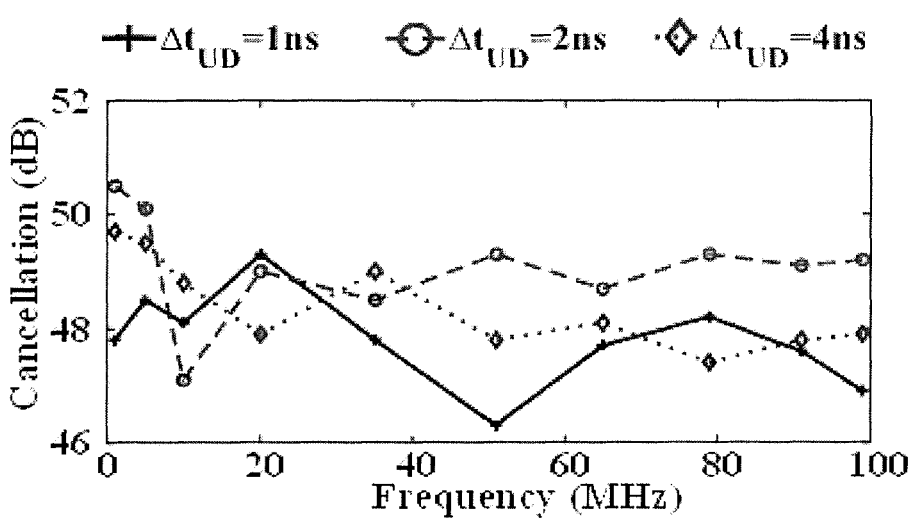
FIG. 25B shows a second plot of measurement of the single-tone undesired signal SpICa performance vs. frequency for three cases of $\Delta t_{UD}$.
Figure 25C:
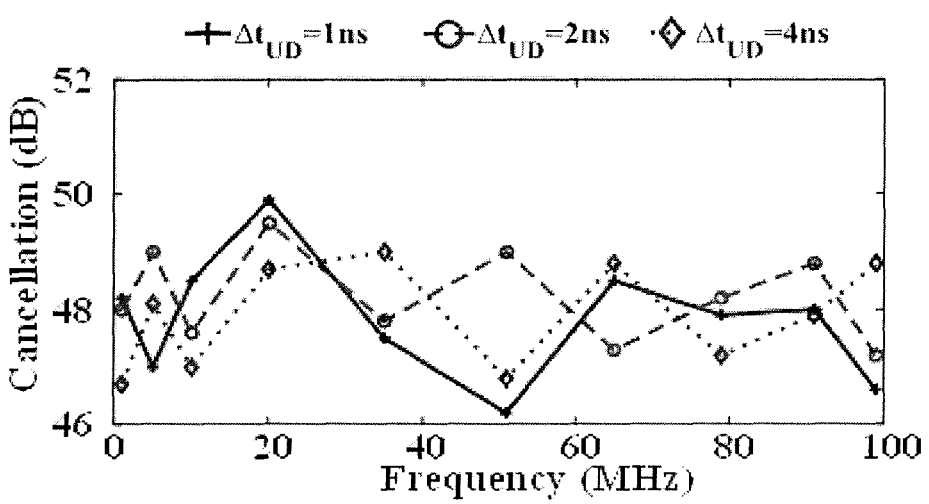
FIG. 25C shows a third plot of measurement results of the single-tone undesired signal SpICa performance vs. frequency for three cases of $\Delta t_{UD}$.

FIG. 25A, FIG. 25B, and FIG. 25C shows the measured SpICa performance for multiple AoA$_{UD}$ (corresponding to Δt$_{UD}$=1, 2, 4 ns) and a swept single-tone from 1 MHz (balun-limited) to 99 MHz. As it can be seen, the cancellation across the entire band is independent of AoA and >46 dB is achieved with an unexpected and surprising 1.5× improvement in fractional BW over conventional technology.

FIG. 26A, FIG. 26B, and FIG. 26C shows the desired signal conversion gains for the swept single-tone inputs from 1 MHz to 99 MHz at the outputs of each of the THM rows, matching closely with the ideal simulated conversion gains. The desired signal gain is defined as the ratio of output power when all inputs are applied, divided by the output power when only one input is applied, assuming all the desired inputs are in-phase and there are no delays between the inputs. This measurement is repeated for four different AoA$_{UD}$ (corresponding to Δt$_{UD}$=0.5, 1, 2.5, 4 ns). In all the cases, the gain response follows closely to the theoretical response.

FIG. 27A shows measured wide modulated BW SpICa performance for 80 MHz BW at the output of the THM's second row with one input (no cancellation) and four inputs (cancellation enabled), demonstrating >35 dB SpICa for a fractional-BW of 80% in the DC-100 MHz band (80 MHz is selected to visualize the plot easier and demonstrate the SpICa clearly). Similar performance is obtained when the cancellation is performed with other THM rows, confirming that the architecture included herein can be used for generating multiple versions of the desired signal simultaneously, while cancelling the undesired interference signals. This desired conversion gains can be equalized in the digital domain.

FIG. 27B shows the desired- and the undesired-signal spectrum (35 MHz within the DC-100 MHz band) with one and four inputs. In this measurement, AoA$_{UD}$=0° and AoA$_D$=45°. More than 35 dB SpICa across the entire BW of the undesired signal is obtained again. The BW of the desired- and the undesired-signal is reduced from 80 MHz to 35 MHz to visually show the cancellation on a 100 MHz plot. The approach can cancel two spatially distinct interferences.

Figure 28B:
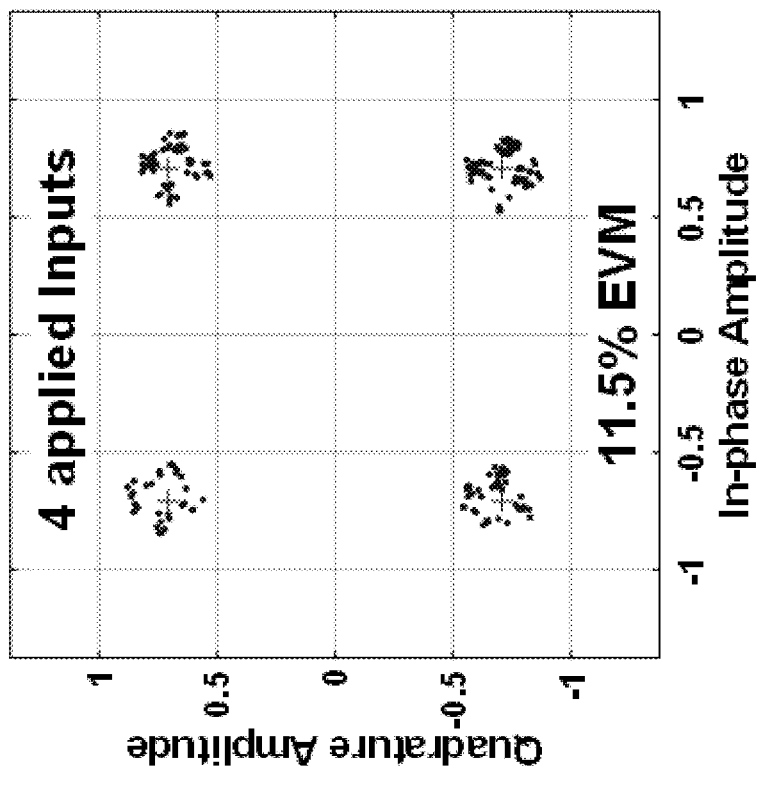
FIG. 28B shows a second reconstructed constellation plot after measurement of the desired 4 Mb/s QPSK signal in presence of a 12 dB stronger wide modulated BW interference
Figure 28A:
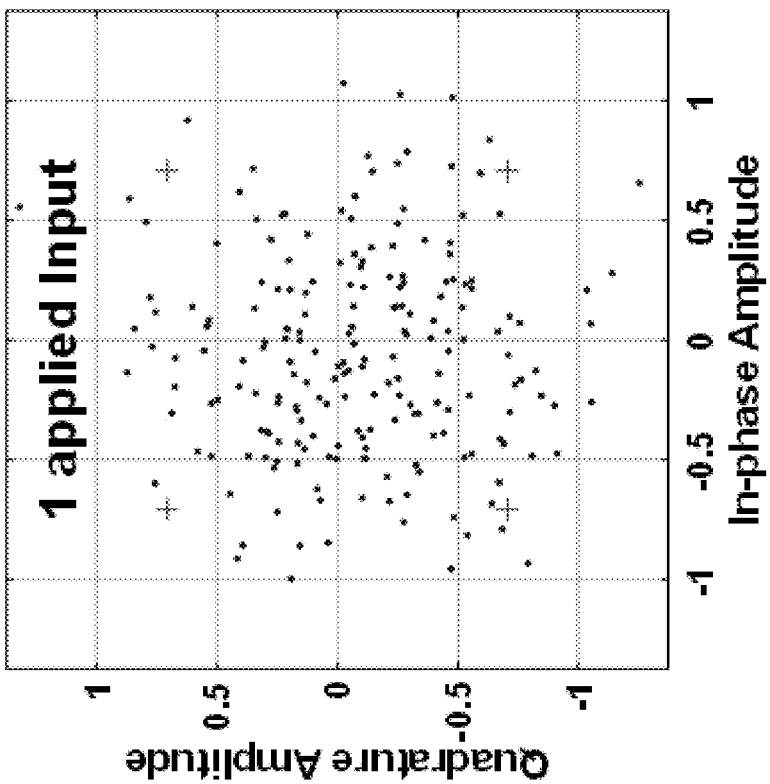
FIG. 28A shows a reconstructed constellation plot after measurement of the desired 4 Mb/s QPSK signal in presence of a 12 dB stronger wide modulated BW interference.

FIG. 28A and FIG. 28B depicts SpICa performance for a wide modulated BW interferer 12 dB higher in power than the desired 4 Mb/s QPSK signal, with an offline-computed EVM of 11.5%. The SpICa data is sampled and stored using the digital sampling oscilloscope followed by digital equalization and EVM estimation in MATLAB. The measured total power consumption of the analog implementation of the THM is 8 mW/100 MHz. Another 44 mW is consumed in clocking including the 0.8 GHz to 0.2 GHz quadrature phase generator, the four 8-bit PIs, and the time-interleaving circuit. The clocking power can be decreased further to less than 5 mW for smaller resolutions (for example, the clocking power is <5 mW for 4-bit resolution). The clocking power can also be decreased if a reduced delay range is needed. The design constraints and power consumption associated with realization of a high-dynamic-range ADC is thus significantly relaxed. With the demonstrated >35 dB wide modulated BW SpICa, the ADC dynamic range are significantly relaxed by nearly 6-b. Notably, a 1b reduction in ADC resolution leads to nearly 4× power savings for ADCs limited by thermal noise. Additionally, the ADC power consumption can increase quadratically for high sampling frequencies.

The demonstrated SpICa of >35 dB over 80 MHz of wide modulated BW interferers is the highest ever reported. The delay range-bandwidth product for the proposed TTD implementation is 1.5 (=15 ns×100 MHz). Cancellation of 80 MHz modulated bandwidth is shown. Measured P1 dB compression point of the BB RX is 4.7 dBm with 10.6 dBm IIP3.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example(s) chosen for purposes of disclosure, and covers all changes and modifications which do not constitute departures from the true spirit and scope of this invention.

We claim:

1. A multi-input multi-output (MIMO) spatial interference cancellation receiver, comprising:
    a phase-shifter configured to time-align at least one or more wideband spatial desired signals and one or more wideband spatial undesired noise signals so as to remove a portion of the one or more undesired signals;
    a discrete time-delay array configured to time-align a residual one or more residual wideband spatially interfering undesired noise signals; and
    a cancellation matrix component configured to cancel out the residual one or more wideband spatially interfering undesired noise signals, wherein the wideband one or more desired signals are noise-free.

2. The multi-input multi-output (MIMO) spatial interference cancellation receiver of claim 1, wherein the discrete time-delay array is configured to provide a delay-compensation range of (n*5 ns) and with a resolution of ((n−1)*5 ps) between a first and a last antenna.

3. The multi-input multi-output (MIMO) spatial interference cancellation receiver of claim 2, wherein the delay-compensation range is from 5 picoseconds (ps) up to 5 nanoseconds (ns) and with a resolution of at least 5 picoseconds between the first and last antenna.

4. The multi-input multi-output (MIMO) spatial interference cancellation receiver of claim 1, further comprising: wherein the multi-input multi-output (MIMO) spatial interference cancellation receiver is configured as an N-element antenna array in a range from 4 up to 1500 antennas so as to receive a combination of the one or more wideband spatial desired signals and the one or more wideband spatially interfering undesired noise signals.

5. The multi-input multi-output (MIMO) spatial interference cancellation receiver of claim 1, further comprising: a plurality of amplifiers configured to amplify the received one or more wideband spatial desired signals and the wideband spatially interfering undesired noise signals while maintaining a signal-to-noise ratio of the one or more wideband spatial desired signals and the one or more wideband spatially interfering undesired noise signals.

6. The multi-input multi-output (MIMO) spatial interference cancellation receiver of claim 1, further comprising: a local oscillator configured to generate a carrier frequency of the one or more wideband spatial desired signals.

7. The multi-input multi-output (MIMO) spatial interference cancellation receiver of claim 1, wherein the cancellation matrix component is a transform component configured as: a Truncated Hadamard transform (THM), a Fourier transform, or a Hamming code matrix.

8. The multi-input multi-output (MIMO) spatial interference cancellation receiver of claim 1, further comprising: a mixer configured to down-convert an amplified received signal to a baseband frequency.

9. The multi-input multi-output (MIMO) spatial interference cancellation receiver of claim 1, further comprising: a current-to-voltage converter and an analog-to-digital converter.

10. The multi-input multi-output (MIMO) spatial interference cancellation receiver of claim 8, further comprising: an anti-aliasing filter to bypass the signal satisfying the Nyquist-Shannon sampling theorem for further sampling of the baseband frequency.

11. The multi-input multi-output (MIMO) spatial interference cancellation receiver of claim 1, further comprising: one or more digital equalizers configured to reduce one or more amplitude and phase mismatches of the one or more desired signals.

12. The multi-input multi-output (MIMO) spatial interference cancellation receiver of claim 1, wherein the discrete time-delay array further comprises a plurality of staggered-time interleaved clocks configured to sample delay intervals of the one or more wideband spatial desired signals resulting from configured one or more antenna separations.

13. The multi-input multi-output (MIMO) spatial interference cancellation receiver of claim 1, wherein the discrete time-delay array comprises a time-interleaver, wherein the time-interleaver is configured to obtain a desired precision and time range.

14. The multi-input multi-output (MIMO) spatial interference cancellation receiver of claim 1, wherein the discrete time-delay array further comprises an N-phase generator configured to provide N outputs so as to enable a cycle coverage of 360° of the one or more wideband spatial desired signals.

15. The multi-input multi-output (MIMO) spatial interference cancellation receiver of claim 1, wherein the discrete time-delay array further comprises a phase interpolator configured to digitally select N phases of the one or more wideband spatial desired signals.

16. The multi-input multi-output (MIMO) spatial interference cancellation receiver of claim 1, wherein the discrete time-delay array further comprises a multiplexer configured to provide an N×N resolution generating N×N phases so as to combine stored sampled values.

17. A multi-input multi-output (MIMO) spatial interference cancellation method, comprising:
time-aligning at least one or more wideband spatial desired signals and one or more wideband spatially interfering undesired noise signals so as to remove a portion of the one or more undesired signals;
discrete time-delaying a residual one or more residual wideband spatially interfering undesired noise signals; and
matrix cancelling out the residual one or more wideband spatially interfering undesired noise signals so as to result in one or more noise-free wideband spatial desired signals.

18. The multi-input multi-output (MIMO) spatial interference cancellation method of claim 17, wherein the discrete time-delaying step further comprises delay-compensating in a range of (n*5 ns) and with a resolution of ((n−1)*5 ps) between a first and a last antenna.

19. The multi-input multi-output (MIMO) spatial interference cancellation method of claim 18, wherein the delay-compensating is in a range from 5 picoseconds (ps) up to 5 nanoseconds (ns) and with a resolution of at least 5 picoseconds between the first and last antenna.

20. The multi-input multi-output (MIMO) spatial interference cancellation method of claim 17, wherein the matrix cancelling out the one or more residual wideband spatially interfering undesired noise signals step further comprises removing an angle dependency and a frequency-dependent residue phase ($\Delta\varphi_{UD}-2\pi f\Delta t_{UD}$).

21. The multi-input multi-output (MIMO) spatial interference cancellation method of claim 17, wherein the matrix cancellation step comprises transforming using a transform selected from: a Truncated Hadamard transform (THM), a Fourier transform, and a Hamming code matrix.

22. The multi-input multi-output (MIMO) spatial interference cancellation method of claim 17, wherein the discrete time-delaying is at least one of: radio frequencies (RF) and baseband (BB).

* * * * *